United States Patent
Richards et al.

(10) Patent No.: US 10,531,055 B2
(45) Date of Patent: Jan. 7, 2020

(54) BEAM COMBINING FOR HIGHLIGHT PROJECTION

(71) Applicant: DOLBY LABORATORIES LICENSING CORPORATION, San Francisco, CA (US)

(72) Inventors: Martin J. Richards, Gig Harbor, WA (US); Barret Lippey, Foster City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/326,889

(22) PCT Filed: Sep. 28, 2017

(86) PCT No.: PCT/US2017/054088
§ 371 (c)(1),
(2) Date: Feb. 20, 2019

(87) PCT Pub. No.: WO2018/064374
PCT Pub. Date: Apr. 5, 2018

(65) Prior Publication Data
US 2019/0215497 A1 Jul. 11, 2019

Related U.S. Application Data

(60) Provisional application No. 62/402,365, filed on Sep. 30, 2016.

(30) Foreign Application Priority Data

Nov. 11, 2016 (EP) .................................... 16198406

(51) Int. Cl.
*H04N 9/31* (2006.01)
*H04N 13/334* (2018.01)
(Continued)

(52) U.S. Cl.
CPC ....... *H04N 9/3126* (2013.01); *G03B 21/2033* (2013.01); *H04N 9/3105* (2013.01);
(Continued)

(58) Field of Classification Search
CPC .... H04N 9/3126; H04N 9/315; H04N 9/3152; H04N 9/3155; H04N 13/332;
(Continued)

(56) References Cited

U.S. PATENT DOCUMENTS 6,807,010 B2 10/2004 Kowarz
6,863,401 B2 * 3/2005 Penn .................. G02B 26/0841
348/771

(Continued)

FOREIGN PATENT DOCUMENTS

CN 101878655 11/2010
CN 105452955 3/2016
(Continued)

OTHER PUBLICATIONS

US 9,906,760 B2, 02/2018, Damberg (withdrawn)
(Continued)

*Primary Examiner* — Bao-Luan Q Le

(57) ABSTRACT

A novel projection system includes first and second light sources (e.g., sets of lasers), a spatial light modulator (SLM) that receives light from the first light source, and a beam steering device that receives light from the second light source and steers the light to highlight regions of the SLM. The SLM then modulates the light from both light sources to generate a highlighted imaging beam which can then be projected on a viewing surface. The highlighted imaging beam can represent a highlighted 2D image or a highlighted left- or right-eye view of a 3D image. The projection system thus improves peak brightness in the displayed highlighted images without incorporating a separate highlight projector (Continued)

or other expensive equipment. Methods for highlighting projected images are also described.

19 Claims, 18 Drawing Sheets

(51) Int. Cl.
    *H04N 13/363* (2018.01)
    *H04N 13/356* (2018.01)
    *H04N 13/332* (2018.01)
    *H04N 13/337* (2018.01)
    *H04N 13/359* (2018.01)
    *H04N 13/339* (2018.01)
    *H04N 13/341* (2018.01)
    *H04N 13/351* (2018.01)
    *G03B 21/20* (2006.01)

(52) U.S. Cl.
    CPC ........... *H04N 9/315* (2013.01); *H04N 9/3132* (2013.01); *H04N 9/3155* (2013.01); *H04N 9/3161* (2013.01); *H04N 13/332* (2018.05); *H04N 13/334* (2018.05); *H04N 13/337* (2018.05); *H04N 13/339* (2018.05); *H04N 13/341* (2018.05); *H04N 13/351* (2018.05); *H04N 13/356* (2018.05); *H04N 13/359* (2018.05); *H04N 13/363* (2018.05)

(58) Field of Classification Search
    CPC .. H04N 13/334; H04N 13/337; H04N 13/339; H04N 13/341; H04N 13/356; H04N 13/359
    See application file for complete search history.

(56) References Cited

U.S. PATENT DOCUMENTS

| | | | |
|---|---|---|---|
| 6,985,272 B2 * | 1/2006 | Bridgwater | H04N 9/3105 348/E9.027 |
| 7,118,225 B2 * | 10/2006 | Penn | G02B 26/0841 353/84 |
| 7,136,209 B2 * | 11/2006 | Lerner | G02B 27/1026 359/237 |
| 7,293,880 B2 | 11/2007 | Sakata | |
| 7,360,900 B2 | 4/2008 | Sakata | |
| 7,394,597 B2 * | 7/2008 | Penn | G02B 26/0841 348/758 |
| 7,936,361 B2 | 5/2011 | Aufranc | |
| 7,961,399 B2 * | 6/2011 | Penn | G02B 26/0841 359/629 |
| 8,842,222 B2 | 9/2014 | Iversen | |
| 8,905,578 B2 | 12/2014 | Svensen | |
| 9,022,582 B2 * | 5/2015 | Kang | H04N 9/3117 353/99 |
| 9,049,413 B2 | 6/2015 | Richards | |
| 9,110,294 B2 | 8/2015 | Perkins | |
| 9,225,951 B2 | 12/2015 | Damberg | |
| 9,848,176 B2 | 12/2017 | Damberg | |
| 9,874,319 B2 | 1/2018 | Minor | |
| 10,003,776 B2 | 6/2018 | Damberg | |
| 2003/0016335 A1 * | 1/2003 | Penn | G02B 26/0841 353/31 |
| 2004/0169823 A1 * | 9/2004 | Bridgwater | H04N 9/3105 353/30 |
| 2005/0162615 A1 * | 7/2005 | Penn | G02B 26/0841 353/31 |
| 2006/0082853 A1 * | 4/2006 | Lerner | G02B 27/1026 359/237 |
| 2007/0126992 A1 * | 6/2007 | Penn | G02B 26/0841 353/84 |
| 2008/0266668 A1 * | 10/2008 | Penn | G02B 26/0841 359/629 |
| 2009/0153752 A1 | 6/2009 | Silverstein | |
| 2009/0161029 A1 * | 6/2009 | Sakaguchi | H04N 9/3126 348/751 |
| 2012/0038693 A1 * | 2/2012 | Kang | H04N 9/3117 345/691 |
| 2014/0043352 A1 | 2/2014 | Damberg | |
| 2015/0036057 A1 | 2/2015 | Richards | |
| 2015/0146409 A1 | 5/2015 | Furuta | |
| 2018/0048873 A1 | 2/2018 | Damberg | |
| 2018/0176519 A1 | 6/2018 | Damberg | |

FOREIGN PATENT DOCUMENTS

| | | |
|---|---|---|
| EP | 2778780 | 9/2014 |
| WO | 20121145200 | 10/2012 |
| WO | 2013/120522 | 8/2013 |
| WO | 20151054797 | 4/2015 |
| WO | 2015/172236 | 11/2015 |
| WO | 2015/184549 | 12/2015 |
| WO | 2015/200138 | 12/2015 |
| WO | 2016/015163 | 2/2016 |
| WO | 2016/023133 | 2/2016 |

OTHER PUBLICATIONS

Kusakabe et al., "High-Dynamic-Range Projector with Dual Modulation for Super Hi-Vision", Jul. 1, 2011, Located via ProQuest, The Futurist, vol. 65, No. 7, pp. 1045-1056.

* cited by examiner

BEAM COMBINING FOR HIGHLIGHT PROJECTION

BACKGROUND

Technical Field

This invention relates generally to image projection systems and methods, and more particularly to image projection systems and methods that improve highlights in projected images.

Description of the Background Art

Video projection systems for use in movie theaters (cinemas) and home theaters are known. While home theater systems usually are capable of displaying only two-dimensional (2D) images, projection systems in movie theaters are often capable of displaying three-dimensional (3D) video. 3D projection systems are very complex and thus expensive. They represent a significant capital investment for the cinema, especially if the 3D projection system is being used to show both 3D and 2D films and is operating in 2D mode a significant portion of the time.

It is also a goal of all projection systems to provide realistic imagery. An important component in realizing this goal is increasing the peak brightness capable of being produced in the projected imagery. For example, most images will include both regions that are very bright (e.g., the sun) and areas that are very dim (e.g., objects in a shadow). Projections systems that have low peak brightness are not able to represent such scenes very realistically, because the bright regions do not appear bright enough to the viewer. Brightness can be increased by adding a separate highlight projector to the projection system. However, the highlight projector represents a significant additional cost to the movie theater, especially in view of the already-expensive 3D projection systems, which often require multiple projectors. Furthermore, the highlight projector must remain aligned with the main projector(s) for the highlighted images to appear realistic and undistorted, which adds yet another on-going maintenance cost and time burden on the movie theater.

SUMMARY

The present invention overcomes the problems associated with the prior art by providing projection systems and methods that increase the brightest parts (highlights) of the projected imagery with minimal complication and additional cost. Embodiments of the invention facilitate adding highlights to 2D images, as well as, adding highlights to the individual left- and right-eye views of projected 3D images.

A projection system according to the invention includes an image data input operative to receive image data, a first light source operative to emit a first illumination beam, and a second light source operative to emit a second illumination beam. Such a projection system also includes a spatial light modulator (SLM), which is disposed to receive light from the first light source and is operative to modulate the light from the first light source based on the image data to generate an imaging beam. A controller is coupled to receive the image data and is operative to generate highlight data based on the image data, to provide the image data to the SLM, and to output the highlight data. A beam steering device is coupled to receive the highlight data from the controller and is also disposed to selectively receive at least a portion of the second illumination beam. The beam steering device steers the second illumination beam to highlight regions of the SLM based on the highlight data. Thus, the SLM also modulates light from the second light source according to the image data to impart highlights in the imaging beam. Projection optics are disposed in the path of the imaging beam and focus the imaging beam on a viewing surface.

The image data can be 2D image data or 3D image data, and in some embodiments, the image data input is configured to sometimes receive 2D image data and at other times receive 3D image data, for example, based on a 2D or 3D display mode. Accordingly, when the image data comprises 2D image data, the controller receives the 2D image data, generates the highlight data based on the 2D image data, provide the 2D image data to the SLM, which then modulates the light from the first and second light sources according to the 2D image data. Additionally, in the case of a projection system capable of 3D, the first light source can be associated with a first-eye view present in the image data when the image data comprises 3D image data, the second light source can be associated with a second-eye view present in the image data when the image data comprises 3D image data, and the second light source can have different spectral characteristics than the first light source. In other embodiments, the projection system can include a polarization device (e.g., a light doubler, etc.) disposed in the path of the imaging beam and operative to impart a polarization state on the imaging beam.

In one particular embodiment, the projection system further includes a second SLM and a redirector, where the second SLM is disposed to receive the second illumination beam and modulate it based on the image data to generate a second imaging beam. However, the redirector is disposed to receive the second illumination beam and selectively redirect at least some of it to the beam steering device prior to the light from the second illumination beam reaching the second SLM. The power of the second illumination beam provided to the beam steering device can be approximately 15% of the power of the first illumination beam. Additionally, in some embodiments the beam steering device includes a liquid crystal on silicon (LCOS) display, whereas in other embodiments, the beam steering device comprises a deformable mirror device (DMD).

Various light sources can be used with the invention. In one embodiment, the first light source includes a first set of primary lights (lasers), and the second light source includes a second set of primary lights having a different spectral composition than the first set of primary lights. In another embodiment, the first light source includes a first white light source, and the second light source includes a second white light source, where the first white light has different wavelength bands of red, green, and blue light than the second white light source. In some embodiments, the controller is operative to cause the second light source/set of primary lights to be selectively energized responsive to the image data being received on the image data input.

In particular embodiments, the projection system is a dual modulation system and includes a pre-modulator disposed in the path of the first illumination beam that modulates the first illumination beam to generate a modulated first illumination beam. Even more particularly, the system can include a beam combiner (e.g., an optical thin film filter, etc.) that combines the modulated first illumination beam and the second illumination beam to generate a combined illumination beam and provides the combined illumination beam to the SLM. Additionally, the controller can model a light field incident on the SLM based on the modulated first illumination beam (and optionally the highlight data), and then adjust the image data based on the modeled light field prior to providing the image data to the SLM. In yet another embodiment, the beam combiner can be located before the pre-modulator and combine the first illumination beam and the steered illumination beam, and output a combined modulation beam to the pre-modulator.

A method for displaying image data with a projection system having a first light source and a second light source is also disclosed. Such a method includes the steps of receiving image data to be displayed by an SLM, generating highlight data based on the image data, illuminating the SLM with light from the first light source, illuminating a beam steering device with light from the second light source, asserting the highlight data on the beam steering device to steer the light from the second light source to highlight regions of the SLM based on the highlight data, and asserting the image data on the SLM to modulate the light from the first light source and the light from the second light source to generate a highlighted imaging beam.

The image data can be 2D image data or 3D image data. Additionally, in some methods, the step of receiving image data can include sometimes receiving 2D image data and other times receiving 3D image data, for example, based on a 2D or 3D display mode. In such a case, a particular method can include illuminating the beam steering device with light from the second light source responsive to receiving the 2D image data. In other methods, such as those associated with a 3D-capable projection system, the first light source can be associated with a first-eye view present in the image data when the image data comprises 3D image data, the second light source can be associated with a second-eye view present in the image data when the image data comprises 3D image data, and the second light source can have different spectral characteristics than the first light source. Still other methods include polarizing the highlighted imaging beam (e.g., with a light doubler, etc.), for example, to facilitate separation of the left- and right-eye views.

Some methods include dual modulation, which can include modulating the light from the first light source with a pre-modulator to generate a modulated illumination beam prior to the step of illuminating the SLM. The method can also include the steps of combining the modulated illumination beam and the light from the second light source that is steered by the beam steering device to generate a combined illumination beam, and illuminating the SLM with the combined illumination beam. As another option, a light field incident on the SLM can be modeled based on the modulated illumination beam and, optionally, the highlight data, and the image data can be adjusted based on the modeled light field prior to asserting the image data on the SLM.

Still another particular method includes the steps of illuminating a second SLM configured to have the image data asserted thereon with light from the second light source, and redirecting at least some of the light from the second light source to the beam steering device prior to the light from the second light source reaching the second SLM.

A 3D projection system according to another embodiment of the invention provides highlighted left-eye and/or right-eye 3D views. The 3D projection system includes an image data input operative to receive 3D image data, a first light source, a second light source, a first projector, and a second projector. The first projector includes an SLM disposed to receive light from the first light source and is operative to modulate the light from the first light source based on the 3D image data to generate a first imaging beam associated with a first-eye view present in the 3D image data. The first projector also includes a controller coupled to receive at least a portion of the 3D image data associated with the first-eye view and operative to generate highlight data based on the 3D image data associated with the first-eye view, to provide the 3D image data associated with the first-eye view to the SLM, and to output the highlight data. A beam steering device of the first projector is coupled to receive the highlight data from the controller, is disposed to receive light from the second light source, and is operative to steer the light from the second light source to highlight regions of the SLM based on the highlight data. Accordingly, the SLM also modulates light from the second light source according to the 3D image data associated with the first-eye view and thus imparts highlights in the first imaging beam. Projection optics disposed in the path of the first imaging beam focus the first imaging beam on a viewing surface. Additionally, a first polarization device (e.g., a light doubler) disposed in the path of the first imaging beam imparts a first polarization state on the first imaging beam. In this embodiment, the second projector generates a second imaging beam associated with a second-eye view present in the 3-D image data, such that the second imaging beam has a second polarization state different than (e.g., orthogonal to) the first polarization state. Optionally, the second projector can also impart highlights in the second imaging beam.

A method providing highlighted views in a 3D projection system includes the steps of receiving 3D image data to be displayed by a first SLM, generating a first highlighted imaging beam associated with a first-eye view present in the 3D image data, polarizing the first highlighted imaging beam in a first polarization state, generating a second imaging beam (which can optionally be highlighted) associated with a second-eye view present in the 3D image, and polarizing the second highlighted imaging beam in a second polarization state different than the first polarization state. The first highlighted imaging beam can be generated by generating first highlight data based on the 3D image data associated with the first-eye view, illuminating the first SLM with light from the first light source, illuminating a beam steering device with light from a second source, using the beam steering device to steer the light from the second light source to highlight regions of the first SLM based on the highlight data, and asserting the 3D image data associated with the first-eye view on the first SLM to modulate light from the first light source and light from the second light source.

Other methods for displaying 2D image data with a 3D projection system are disclosed, where the 3D projection system has first and second light sources of different spectral composition that are associated with first- and second-eye views present in 3D image data, respectively. One such method includes the steps of receiving image data to be displayed by an SLM, determining whether the image data comprises 3D image data or 2D image data, asserting the image data on the SLM, illuminating the SLM with light from the first light source, and if the image data is determined to be 2D image data, causing the SLM to be further illuminated by light from the second light source. Another such method includes the steps of receiving image data to be displayed by an SLM, asserting the image data on the SLM, illuminating the SLM with an illumination beam from one of the first light source and the second light source, determining whether the image data is 3D image data or 2D image data, and if the image data is determined to be 2D image data, causing at least a portion of the illumination beam to be redirected from the SLM to a second SLM configured to have the 2D image data asserted thereon.

A method of manufacturing a projection system according to the invention includes the steps of providing a first light source, providing a second light source, providing an SLM disposed to receive light from at least one of the first light source and the second light source and being operative to modulate light to generate an imaging beam, providing a beam steering device that is disposed to receive light from the second light source and that is operative to controllably steer light from the second light source toward selected regions of the SLM, and providing a beam combiner that is disposed to receive the light from the first light source and the steered light from the beam steering device and that is operative to combine the light from the first light source and the steered light from the second light source and provide the combined light to the SLM. A more particular method includes the step of providing a polarization device disposed in an imaging beam path of the SLM.

Non-transitory, electronically readable storage medium having code embodied thereon for causing an electronic device to perform various methods of the invention are also disclosed.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by providing projection systems and methods that increase the brightest parts (highlights) of the projected imagery with minimal complication and additional cost. In the following description, numerous specific details are set forth (e.g., particular control modules, particular highlighting routines, etc.) in order to provide a thorough understanding of the invention. Those skilled in the art will recognize, however, that the invention may be practiced apart from these specific details. In other instances, details of well-known projection practices (e.g., modulator control, routine optimization, etc.) and components have been omitted, so as not to unnecessarily obscure the present invention.

Figure 1:
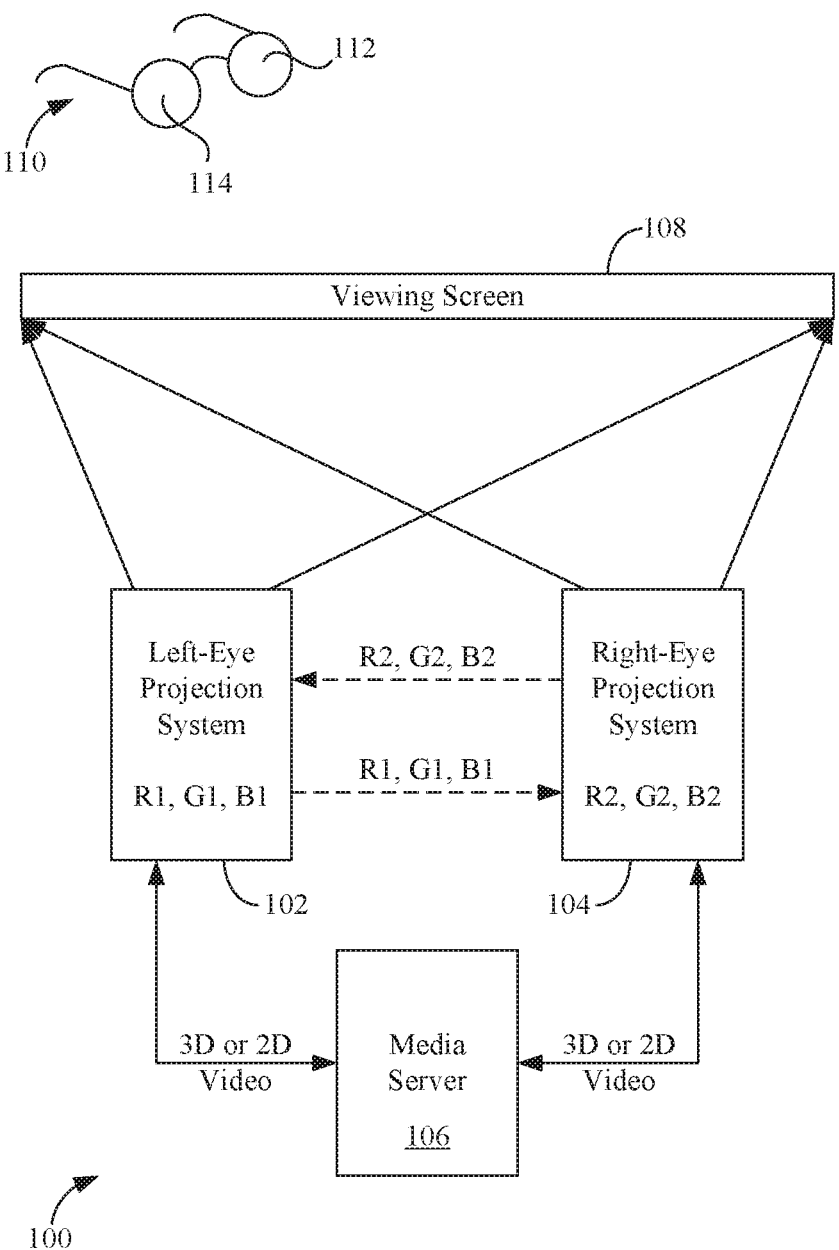
FIG. 1 shows a 3D projection system 100 according to one embodiment of the present invention.

FIG. 1 is a block diagram showing a three-dimensional (3D) projection system 100 according to one embodiment of the present invention. 3D projection system 100 includes a left-eye projection system (LEPS) 102 and a right-eye projection system (REPS) 104, which are served media (e.g., 2D or 3D video and image content) from a media server 106. LEPS 102 and REPS 104 project images onto a viewing screen 108 (e.g., a high gain screen, etc.) for viewing by an audience. LEPS 102 and REPS 104 are positioned at different locations within a theater, but their projected images are aligned (registered) with each other on viewing screen 108 so the audience perceives only one image.

LEPS 102 and REPS 104 can operate in either 3D or 2D mode, depending on the media that they are served by media server 106. In 3D mode, LEPS 102 projects a left-eye image and REPS 104 projects a right-eye image, which are present in the 3D media provided from media server 106. Media server 106 can serve video that is left-eye and right-eye specific to each of LEPS 102 and REPS 104, or it can serve combined 3D video data, and LEPS 102 and REPS 104 can parse the combined 3D video data into left- and right-eye image data themselves.

In this embodiment, projection system 100 provides spectral separation of the left- and right-eye images to facilitate 3D viewing. Specifically, LEPS 102 employs a first set of primary light sources having spectral bands R1, G1, and B1, whereas REPS 104 employs a second set of primary light sources having spectral bands R2, G2, B2. Because the spectral bands of LEPS 102 and REPS 104 are different (e.g., comprise different wavelengths in the red, green, and blue regions of the visible spectrum), the left-eye and right-eye images can be differentiated when viewed by the audience through spectral 3D glasses 110. The 3D glasses 110 includes a left-eye lens 112, which includes an optical filter that passes the R1, G1, B1 bands but blocks the R2, G2, B2 bands, and a right-eye lens 114, which passes the R2, G2, B2 bands but blocks the R1, G1, B1 bands. Thus, the wearer of 3D glasses 110 views left-eye and right-eye images projected by LEPS 102 and REPS 104 through the left-eye lens 112 and right-eye lens 114, respectively, and perceives a 3D image.

In 2D mode, LEPS 102 and REPS 104 project a series of 2D images on viewing screen 108 according to the 2D media provided by media server 106. LEPS 102 and REPS 104 can display a series of frames of 2D media in any convenient way, such as each displaying the same frame of the 2D media at the same time, displaying frames of the 2D media sequentially in alternation, etc. Because 2D media is not intended for 3D viewing, spectral glasses 110 are not used in 2D mode such that each eye of the viewer will observe light that is output by each of LEPS 102 and REPS 104. Thus, as will be discussed below in various embodiments, LEPS 102 and/or REPS 104 can utilize the lights of the other of REPS 104 and LEPS 102 to add highlighting to the 2D images, thereby improving the brightness of the projected 2D images and making them appear more realistic to the viewing audience.

It should be noted at the outset that the following description of the present invention will often be made with respect to 3D projection systems that are adding highlights to projected 2D images when operating in a 2D mode, because such an embodiment provides particular advantages. However, it should be understood that the highlighting componentry and methods described herein are equally applicable to dedicated 2D projection systems (i.e., those incapable of projecting 3D). Additionally, embodiments will be described where highlighting is added to each of the left-eye and right-eye views of projected 3D imagery.

Figure 2A:
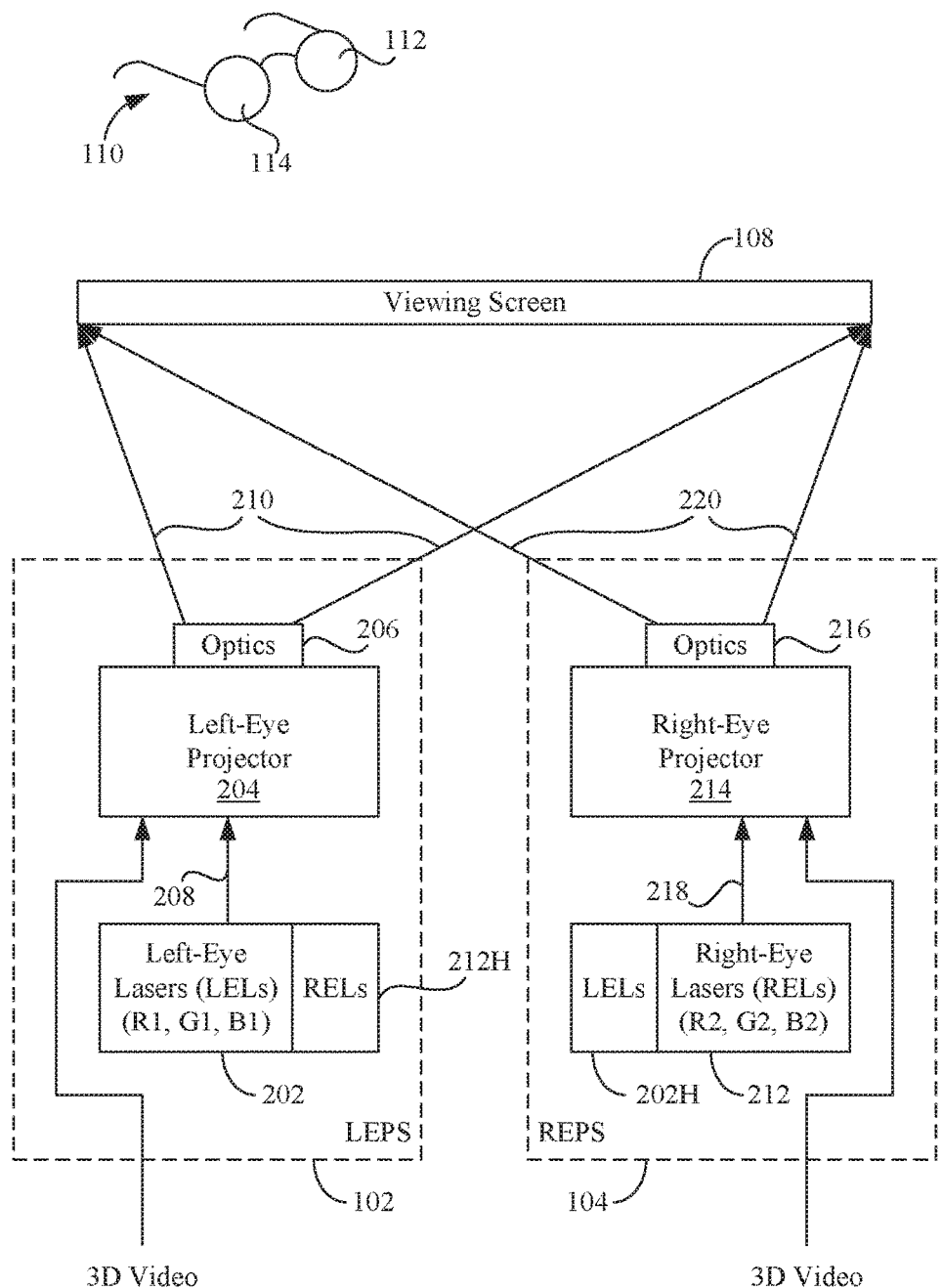
FIG. 2A shows the 3D projection system of FIG. 1 in greater detail and operating in 3D mode.

FIG. 2A is a block diagram showing 3D projector system 100 in greater detail and operating in 3D mode. Accordingly, 3D video (image) data is provided to LEPS 102 and REPS 104.

LEPS 102 is shown in greater detail to include a set of left-eye lasers (LELs) 202, a left-eye projector 204, and projection optics 206. LELs 202 are laser light sources that provide a first illumination beam 208 having a first spectral composition (e.g., R1, G1, B1) to left-eye projector 204. In some embodiments illumination beam 208 is provided as a composite beam and in other embodiments separate illumination beams are provided for each of the discrete red, green, and blue channels. Left-eye projector 204 represents a projector kernel that houses modulators and optics to modulate the illumination beam 208 according to left-eye images present in the 3D video data and output a left-eye imaging beam 210 for projection the left-eye onto viewing screen 108 via projection optics 206. Projection optics 206 focus the left-eye imaging beam 210 on viewing screen 108.

Similarly, REPS 104 is shown in greater detail to include a set of right-eye lasers (RELs) 212, a right-eye projector 214, and projection optics 216. RELs 212 are laser light sources that provide illumination beam(s) 218 having a second spectral composition (e.g., R2, G2, B2) different from the spectral composition of LELs 202. Right-eye projector 214 represents a projector kernel that houses modulators and optics to modulate the illumination beam 218 according to right-eye images present in the 3D video data and output a right-eye imaging beam 220 for projecting the right-eye images onto viewing screen 108 via projection optics 216. Projection optics 216 focus the left-eye imaging beam 220 on viewing screen 108.

FIG. 2A also shows that LEPS 102 includes some right-eye lasers 212H and that REPS 104 includes some left-eye lasers 202H. RELs 212H and LELs 202H have the same spectral compositions as RELs 204 and LELs 202, respectively, but are denoted with an "H" to indicate that they are used for adding highlights to the principal images projected by LEPS 102 and/or REPs 104, respectively, when projection system 100 is operating in 2D mode, as will be discussed in more detail below. However, the RELs 212H and the LELs 202H are not powered in 3D mode in this embodiment due to the spectral separation of the left-eye and right-eye images. For example, any highlighting added to the left-eye imaging beam 210 via the RELs 212H would be blocked by the left-eye lens 112 of glasses 110, and any highlighting added to the right-eye imaging beam 220 by the LELs 202H would be blocked by the right-eye lens 114. (3D highlighting embodiments are discussed below.)

While LELs 202, 202H and RELs 212 and 212H are described herein as lasers, it should be understood that the light sources used by LEPs 102 and REPs 104 can take various suitable forms. For example, LELs 202, 202H and RELs 212, 212H can be replaced with white light sources having different red, green, and blue spectral bands, respectively. As another option, LED arrays having different spectral characteristics could be provided as the light sources.

Figure 2B:
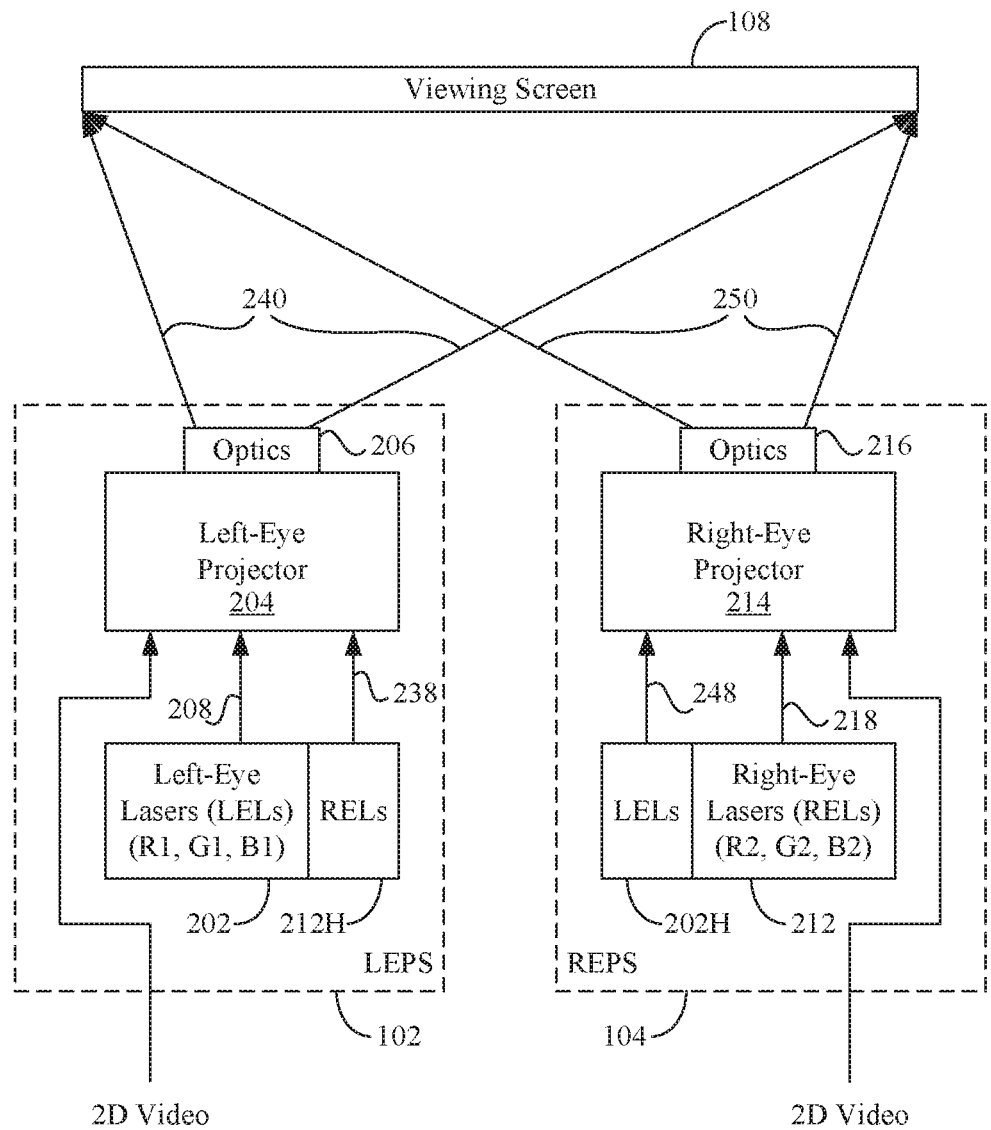
FIG. 2B shows the 3D projection system of FIG. 2A operating in 2D mode.

FIG. 2B shows 3D projection system 100 operating in 2D mode. Accordingly, 2D video (image) data is provided to LEPS 102 and REPS 104 from media server 106. Because no separation of the images provided by LEPS 102 and REPS 104 is required in 2D mode, viewers in the audience do not need to wear 3D glasses 110.

In 2D mode, the RELs 212H of LEPS 102 provide a second illumination beam 238 (e.g., separate beams for each of the three primary color bands, a composite white beam having spectral composition R2, B2, G2, etc.) to left-eye projector 204. Projector 204 utilizes the light from RELs 212H to add highlighting to regions of the principal image generated by left-eye projector 204 based on the 2D image data. Accordingly, projection optics 206 outputs a highlighted imaging beam 240 for displaying a highlighted 2D image on viewing screen 108. Similarly, LELs 202H of REPS 104 provide a second illumination beam 248 for right-eye projector 214 to use to add highlighting to regions of the principal image generated by right-eye projector 214 based on the 2D image data. Projection optics 216 then outputs a highlighted imaging beam 250 for displaying a highlighted 2D image on viewing screen 108. As will be described in more detail below, the highlighting increases the peak brightness and improves the realism of the projected images.

In this embodiment, the laser power of RELs 212H that are added to left-eye projection system 102 is approximately 15% of the total laser power of LELs 202. Similarly, the laser power of LELs 202H that are added to right-eye projection system 104 is approximately 15% of the total laser power of RELs 212. The inventors have found that this small increase in laser power can increase the brightness levels in the highlighted regions of the imaging beams 240 and 250 by more than 10 times the maximum brightness levels obtainable using the LELs 202 and RELs 212 alone. For example, in an existing projection system that produces a maximum brightness of 108 nits in 2D mode, the inventors found that adding RELs 212H and LELs 202H to the system and implementing the highlighting disclosed herein increased the peak brightness of the projection system to more than 1000 nits. Thus, the invention improves the realism of the displayed 2D images by increasing their peak brightness to well above the peak brightness capabilities of a projection system without LELs 202H, RELs 212H, and the inventive highlighting capabilities.

Figure 3:
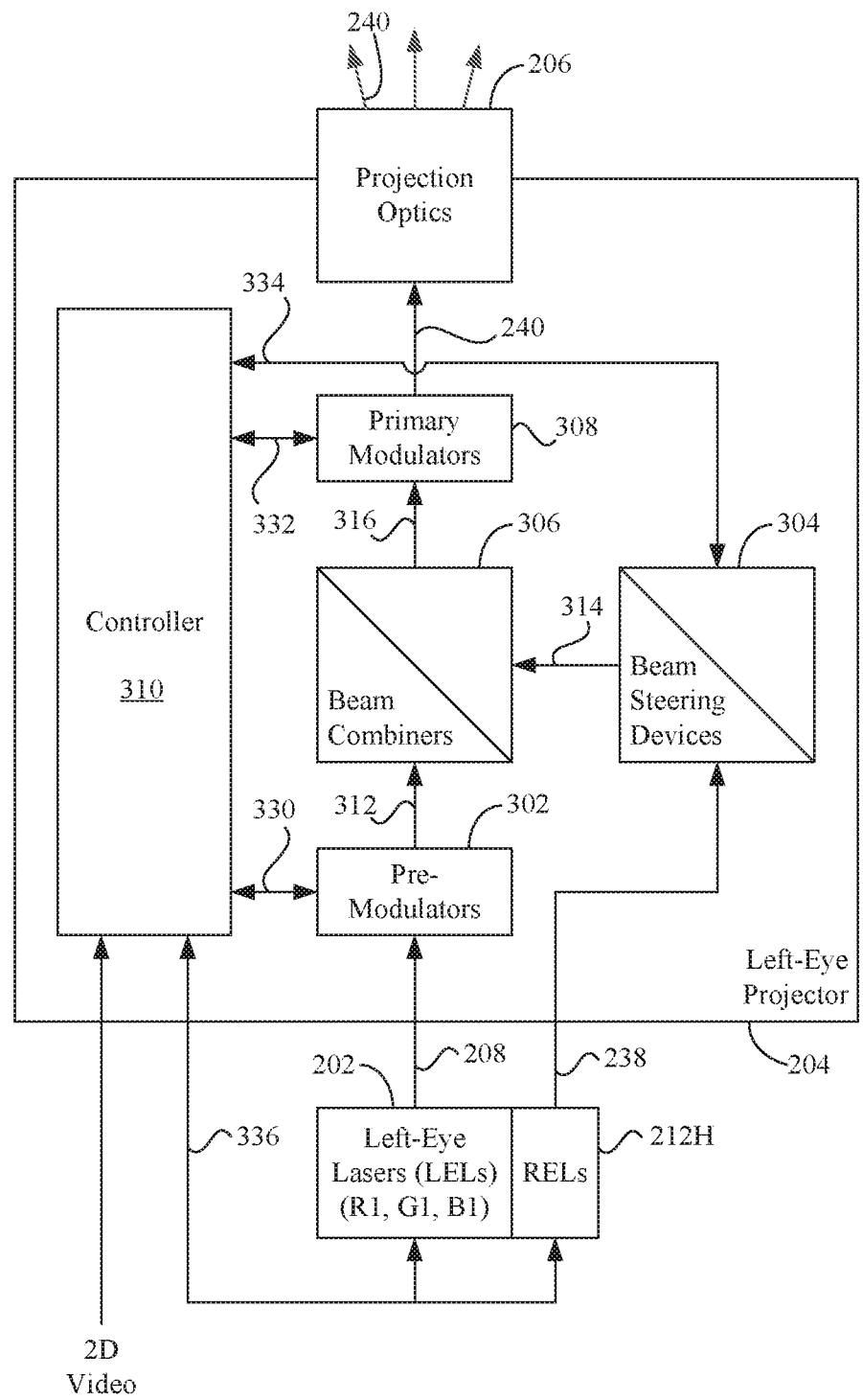
FIG. 3 shows the left-eye projector of FIGS. 2A and 2B in greater detail.

FIG. 3 is a block diagram showing the left-eye projector 204 (FIGS. 2A-2B) of LEPS 102 in greater detail. FIG. 3 will be described assuming that LEPS 102 and left-eye projector 204 are operating in 2D mode such that highlighting is applied. It should further be understood that the right-eye projector 214 (FIGS. 2A-2B) of REPS 104 will have substantially the same componentry as that shown for left-eye projector 204.

Left-eye projector 204 is shown to include one or more pre-modulators 302, one or more beam steering devices 304, one or more beam combiners 306, and one or more primary modulators 308. While FIG. 3 is shown with only one of each of the above elements for simplicity, it will be understood that left-eye projector 204 will include a pre-modulator 302, a beam steering device 304, a beam combiner 306, and a primary modulator 308 for each of the red, blue, and green color channels. Additionally, while FIG. 3 shows light beams passing through the above elements for simplicity, in some embodiments light may actually be reflected off the element instead. Finally, the functions of the elements of FIG. 3 will sometimes be described in the singular for simplicity. However, it should be understood that this functionality is common to each iteration (e.g.,. across each color channel) of the element.

Pre-modulators 302 comprise a plurality of reflective spatial light modulators (SLMs) 302 (one for each primary color of LELs 202). In some embodiments, pre-modulators 302 can be embodied on a Philips prism, which provides separation of the constituent colors of a composite white light beam, should illumination beam 208 be provided as such. Left-eye projector 204 utilizes pre-modulators 302 for dual modulation purposes, which increases the dynamic range of the projected images by pre-attenuating portions of the illumination beam that are associated with darker regions of an image. Accordingly, each pre-modulator 302 modulates an associated illumination beam 208 with an illumination pattern based on the control signals and illumination data provided by controller 310, to generate a modulated illumination beam 312. Optionally, the colored modulated illumination beams 312 can be recombined into a single modulated illumination beam 312. In a particular embodiment, pre-modulator 302 comprises a deformable mirror device (DMD), for example at a resolution of 2048×1080 pixels (2K). However, other types of SLMs, such as a liquid crystal on silicon (LCOS) device, can be used. Pre-modulators 302 can also be implemented as part of an illumination optics stage of projector 204, which contains other light conditioning elements.

Beam steering devices 304 also comprise a plurality of reflective spatial light modulators 304 (e.g., one for each primary color of RELs 212H) and can optionally be embodied on a Philips prism as well. Each beam steering device 304 receives highlight data from controller 310 indicative of regions on primary modulator 308 to be highlighted, and based on the highlight data, steers light in the illumination beam 238 so that it will eventually impinge on the regions of primary modulator 308 to be highlighted. Accordingly, beam steering device 304 outputs a steered illumination beam 314, which is provided to beam combiner 306.

Beam steering device 304 can be implemented using a phase-retarding modulator. For example, a liquid crystal device (e.g., a reflective LCOS device) that selectively changes the phase of portions of illumination beam 238 can be used, whereby light from illumination beam 238 can be steered (e.g., on a pixel-by-pixel basis, on a region-by-region basis, etc.) to impinge on the regions of primary modulator 308 that are selected for highlighting. In a particular embodiment, the LCOS beam steering device 304 has 2K resolution. As another example, beam steering device 304 can be implemented using a phase-retarding DMD. As still another example, beam steering device 304 can be implemented using an array of mirrors (e.g., 100×100 mirrors) that are able to tilt around two axes to steer the incident light in the desired directions.

Beam combiner 306 receives both modulated illumination beam 312 from pre-modulator 302 and steered illumination beam 314 from beam steering device 304, combines the two beams, and outputs a combined illumination beam 316 to primary modulator 308. In one embodiment, beam combiner 306 is implemented as part of a point-spread function (PSF) optics section of projector 204 that receives the various illumination beams as inputs and then outputs a desired light field (e.g., blurred and collimated light) to primary modulator 308 as the combined illumination beam 316. Because PSF optics sections of 3D projectors are typically serviceable and upgradable, existing 3D projectors can be readily and inexpensively retrofitted with beam steering devices 304 and beam combiners 306. Thus, the invention provides this advantage in addition to the improved brightness discussed above.

Optionally, beam combiner 306 can be disposed prior to pre-modulator 302. In such an embodiment, beam combiner 306 can receive illumination beam 208 from LELs 202 and steered illumination beam 314 from beam steering device 304, combine them, and provide a combined illumination beam to pre-modulator 302. Alternatively, in the case where dual modulation and pre-modulator 302 are not utilized, beam combiner 306 could provide the combined illumination beam directly to primary modulator 308.

In a particular embodiment, beam combiner 306 comprises a dichroic beam combiner that enables light from LELs 202 and light from RELs 212H to be combined. This can be accomplished with beam combiners 306 for the discrete red, green, and blue channels as mentioned above. In the case of white light, a beam combiner 306 can be implemented using an optical thin film filter(s) similar to 3D glasses 110.

Primary modulator 308 receives the combined illumination beam 316, which is formed from both modulated illumination beam 312 and steered illumination beam 314 from beam combiner 306, and modulates combined illumination beam 316 according to the 2D image data and control signals asserted thereon by controller 310. This modulation infuses the light with both an image that is present in the 2D image data as well as highlight regions based on the steered illumination beam 314, thereby generating highlighted imaging beam 240. Projection optics 206 then focuses highlighted imaging beam 240 on viewing surface 108. In a particular embodiment, primary modulator 308 comprises a DMD, for example with a 4096×2160 (4K) resolution.

Controller 310 provides overall coordination and control for the various elements of FIG. 3. For example, controller 310 provides illumination data and control signals to pre-modulator 302 via control path 330. Similarly, controller 310 provides adjusted image data and control signals to primary modulator 309 via control path 332. Furthermore, controller 310 determines highlight data based on the input image data, and provides the highlight data and control signals to beam steering device 304 via control path 334. Controller 310 can also selectively energize LELs 202 and RELs 212H via control path(s) 336.

It should be noted that highlighting can be provided using LEPS 102 and REPS 104 at the same time, in alternation, or from only one of LEPS 102 and REPS 104 as desirable based on a particular application. Additionally, if localized heating of a primary modulator (e.g., primary modulator 308) limits the amount of highlighting achievable by one of LEPS 102 and REPS 104, then both of LEPS 102 and REPS 104 can be used to approximately double the maximum brightness of highlights in a particular image region, while reducing the local heating on each individual primary modulator.

It should also be noted here that the componentry shown in FIG. 3 can alternatively be embodied in a dedicated 2D projection system that generates only two-dimensional imagery. In such a case, REPS 104 can be eliminated because a dedicated 2D projection system does not require the capability to generate individual left-eye and right-eye views required for 3D. Also, the LELs 202 and RELs 212H shown in FIG. 3 can be implemented as two light sources in the dedicated 2D projector having the same or different spectral characteristics, again because the ability to distinguish between left-eye and right-eye views is not required. Accordingly, the present invention can provide image highlighting and its associated advantages in a projection system capable of displaying only 2D images.

Figure 4:
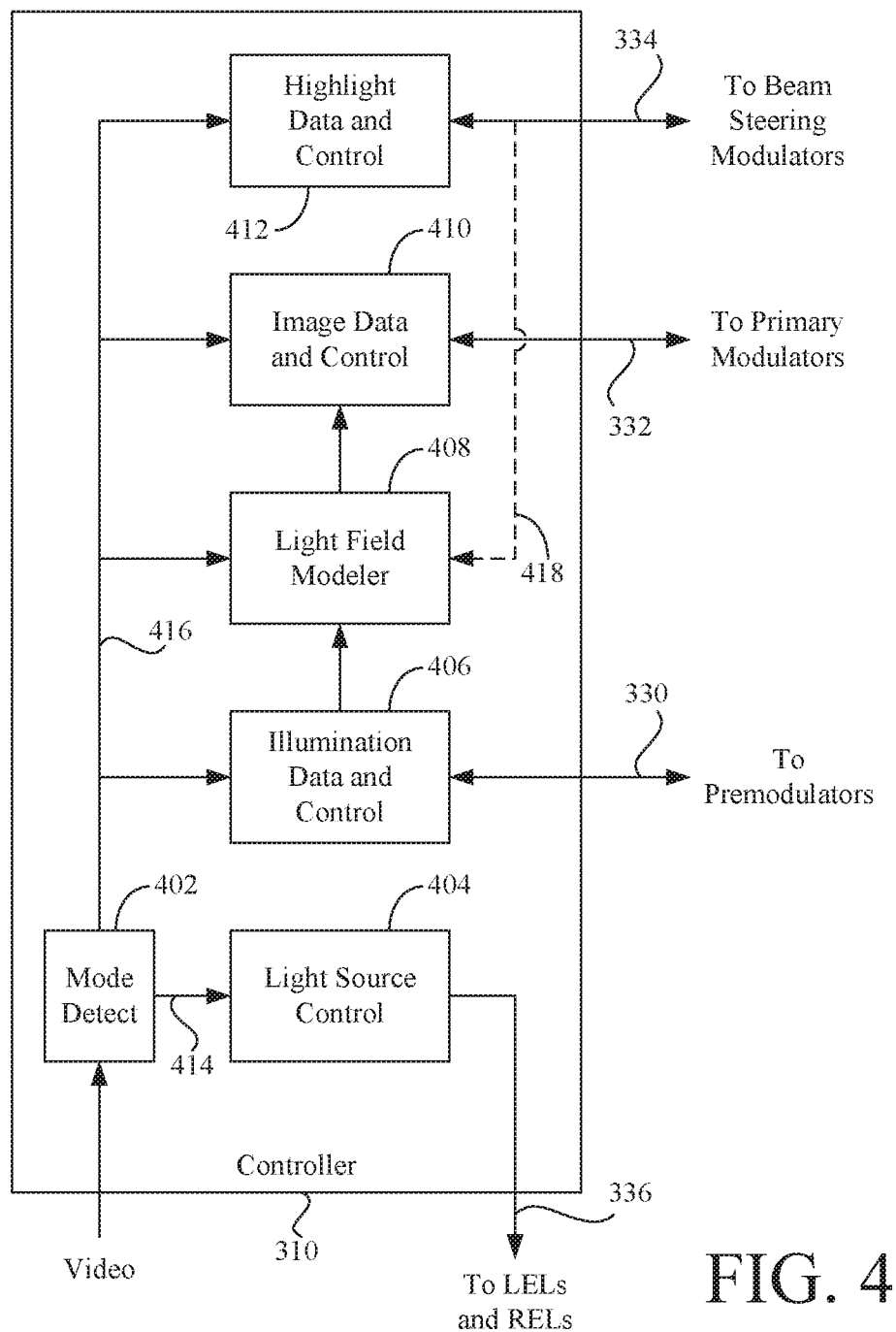
FIG. 4 shows the controller of FIG. 3 in greater detail.

FIG. 4 is a block diagram showing controller 310 (FIG. 3) in greater detail according to a particular embodiment of the invention. Controller 310 includes a mode detect module 402, a light source control module 404, an illumination data and control module 406, a light field modeler 408, an image data and control module 410, and a highlight data and control module 412. The modules and associated functionality of controller 310 can be implemented using hardware, software, firmware, or some combination thereof. Accordingly, it should be understood that left-eye projector 204 and/or LEPS 102 can include one or more processing units, working memory (e.g., RAM), and non-volatile data storage (e.g., hard disk drives, solid state memory, etc.) to implement the described functionality. In a particular embodiment, the functionality of the modules of controller 310 is implemented by software being executed on processor(s) and in RAM of left-eye projector 204. Accordingly, code for these software modules can be stored in a non-transitory medium (e.g., non-volatile data storage), even when left-eye projector 204 is powered down.

Mode detect module 402 enables left-eye projector 204 to determine if it is operating in 2D or 3D mode. Here, module 402 detects the mode based on the image data input to controller 310, for example, using header information, a data format, etc. that is present in the image data. Alternatively, media server 106 could notify mode detect module 402 of the desired display mode based on the type of data (2D or 3D) that media server 106 provides. Mode detect module 402 then notifies light source control module 404 of the display mode via communication pathway 414. Mode detect module 402 further communicates the display mode and/or image data to the other modules of controller 310 via communication pathway 416.

Light source control module 404 controls the LELs 202 and the RELs 212H according to the display mode. In 3D mode, module 404 causes only the LELs 202 to be energized. However, in 2D mode, module 404 causes both the LELs 202 and the RELs 212H to be energized, so that highlighting can be added to the 2D images.

Illumination and data control module 406 receives the image data, analyzes the image data, and then outputs pre-modulation data and control signals to pre-modulator 302, so that pre-modulator 302 will modulate illumination beam 208 in the desired way. In this embodiment, left-eye projector 204 is a dual modulation projector, which facilitates increased dynamic range. For example, using the input image data, module 406 can determine which pixels of primary modulator 308 will be displaying darker regions of an image. Accordingly, module 406 can generate and provide illumination data to pre-modulator 302 such that pre-modulator 302 will attenuate the portions of illumination beam 208 that are associated with the darker regions of the image. This pre-modulation, in turn, decreases the amount of required attenuation by primary modulator 308 in those darker regions. As a result, the light output of dark pixels of primary modulator 308 will be closer to 0%, which improves the dynamic range of left-eye projector 204.

In the present example, illumination data and control module 406 operates the same in 2D and 3D modes. However, in other embodiments, module 406 could generate illumination data so that pre-modulator 302 modulates the illumination beam 208 based on any expected highlighting. As another option, for example where the illumination beam 208 and the steered illumination beam 314 are combined prior to pre-modulation and pre-modulator 302 receives a combined illumination beam, illumination data and control module 406 could generate illumination data for pre-modulator based on the highlighting.

The illumination data and/or control signals generated by illumination data and control module 406 are also provided to light field modeler 408. Light field modeler 408 utilizes the illumination data to determine how an associated pre-modulator 302 will modulate the illumination beam 208 and, based on this analysis, generates a model of the light field that will impinge on an associated primary modulator 308. The modeled light field represents the light that will be impinging on the modulating surface of primary modulator 308. Light field modeler 408 then outputs the modeled light field to image and data control module 410.

In one embodiment, light field module 408 operates the same in both 2D and 3D mode. In an alternative embodiment, light field modeler 408 can take the highlights expected to be provided on primary modulator 308 by steered illumination beam 314 into account when determining the light field.

Image data and control module 410 receives the modeled light field and the image data, and then adjusts the image data based on the modeled light field. For example, in this dual modulation embodiment, module 410 can adjust the image data associated with the darker regions of the image to compensate for the diminished light field in those darker regions as a result of the pre-modulation in both 2D and 3D modes.

In 2D mode, highlight data and control module 412 generates highlight data based on the 2D image data and provides the generated highlight data to beam steering device 304. The highlight data gets asserted on beam steering device 304, which causes device 304 to steer the light from illumination beam 238 in the desired directions toward the highlight regions. Module 412 can use any desired method to generate the highlight data. For example, based on the image data, module 412 can identify all pixels that have an intensity value above a predefined threshold (e.g., above 90% of maximum), and then generate highlight data that causes beam steering device 304 to steer light to the regions of primary modulator 308 corresponding to the identified pixels. As another option, module 412 can divide the image into a plurality of predefined regions associated with primary modulator 308, identify a predetermined number of the brightest predefined regions, and then generate highlight data that causes beam steering device 304 to steer light to the identified regions of primary modulator 308. These are only two examples. The highlighting routines employed by module 412 can be adjusted based on the desired application and based on the type of beam steering device 304 that is used.

In this embodiment, highlight data and control module 412 is inoperative in 3D mode. However, in later embodiments described herein where highlighting is provided in 3D mode, highlight data and control module 412 can generate highlight data to highlight one or both of a left-eye view and a right-eye view.

It should also be noted that a feedback 418 is shown in FIG. 4 from highlight data and control module 412 to light field modeler 408. If feedback 418 is used, light field modeler 408 can take the generated highlight data into account when determining the light field to provide to image data and control module 410. This feedback can help decrease the black level (i.e., improve the contrast) of small dark regions located in a region of primary modulator 308 that is being highlighted by beam steering device 304. As another option, feedback 418 can be provided to illumination data and control module 406 if it is desired that module 406 determine illumination data based on the highlight data generated by module 412. This could be useful, for example, where beam combiner 306 is disposed prior to pre-modulator 302.

Finally, the functionality of the elements shown in FIG. 4 can be adjusted as appropriate in the case of the dedicated 2D projection system described. For example, in a dedicated 2D projection system, the mode detect module 402 can be eliminated, because there is only one mode. This and other possible modifications will be apparent based on the particular projection system in which the highlighting features of the present invention are being implemented.

Figure 5A:
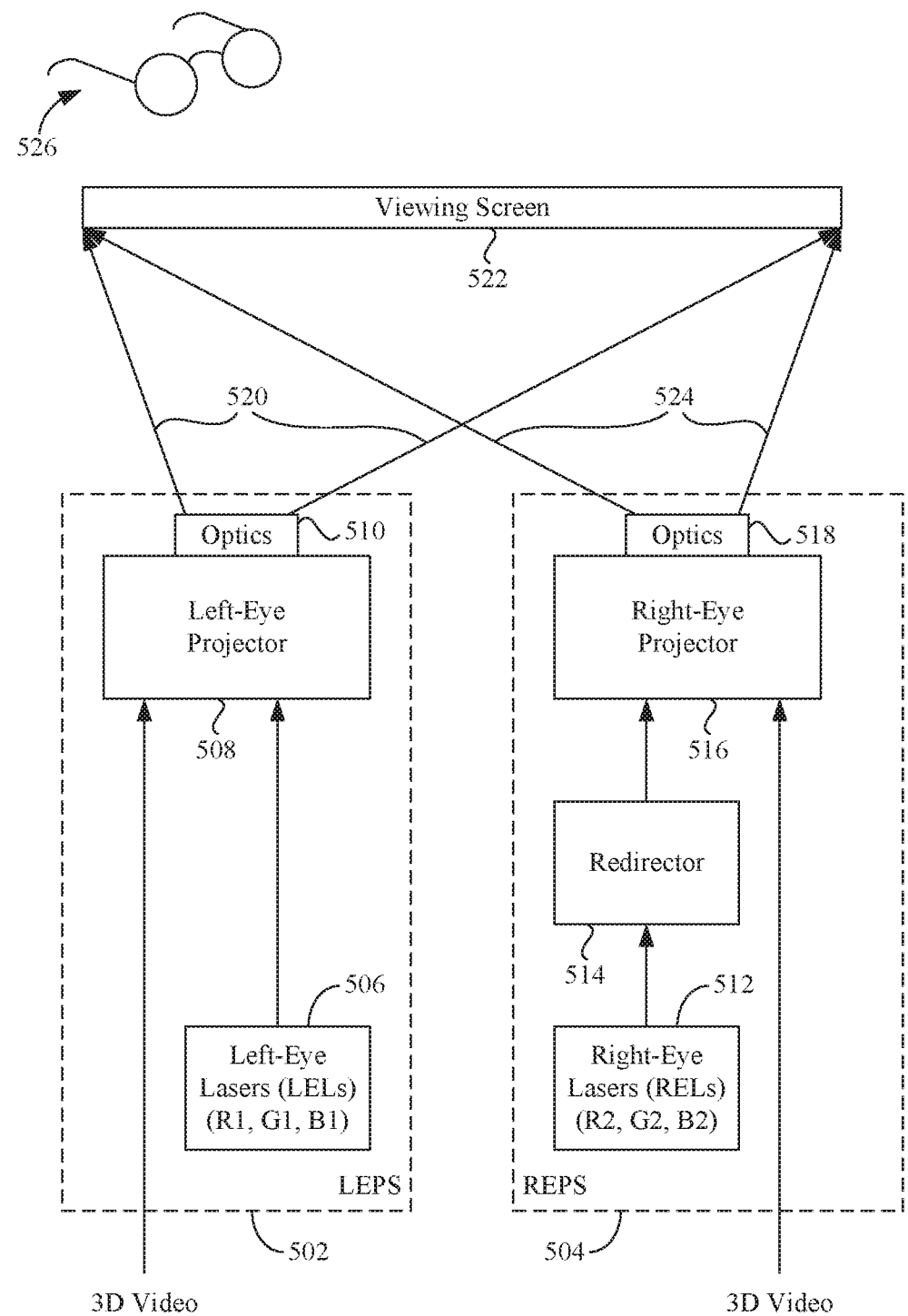
FIG. 5A shows a 3D projection system according to another embodiment of the invention and operating in 3D mode.

FIG. 5A is a block diagram showing a projection system 500, according to an alternative embodiment of the invention, operating in 3D mode. Projection system 500 includes a left-eye projection system (LEPS) 502 and a right-eye projection system (REPS) 504. LEPS 502 includes a set of left-eye lasers (LELs) 506, a left-eye projector 508, and projection optics 510. REPS 504 includes a set of right-eye lasers (RELs) 512, a redirector 514, a right-eye projector 516, and projection optics 518.

LEPS 502 is configured to operate in a 3D or 2D mode depending on the type of video data provided by a media server (not shown). In FIG. 5A, LEPS 502 is operating in a 3D mode due to 3D video data received on its data input. Left-eye projector 508 modulates light from LELs 506 to generate a left-eye imaging beam 520, which is projected onto viewing screen 522 via projection optics 510. As in projector system 100, LELs 506 produce light in a first set of red, green, and blue spectral bands (e.g., R1, G1, and B1).

REPS 504 is also configured to operate in a 3D or 2D mode depending on the type of video data provided by the media server. In 3D mode, redirector 514 passes all of the light from RELs 512 to right-eye projector 516. Right-eye projector 516 modulates light from RELs 512 to generate a right-eye imaging beam 524, which is projected onto viewing screen 522 via projection optics 518. RELs 512 produce light in a second set of red, green, and blue spectral bands (e.g., R2, G2, and B2), which are different than the spectral bands of LELs 506. As in projection system 100, these different spectral bands facilitate spectral separation of the left- and right-eye views by audience members wearing spectral 3D glasses 526, which are similar to the 3D glasses 110 discussed previously.

Figure 5B:
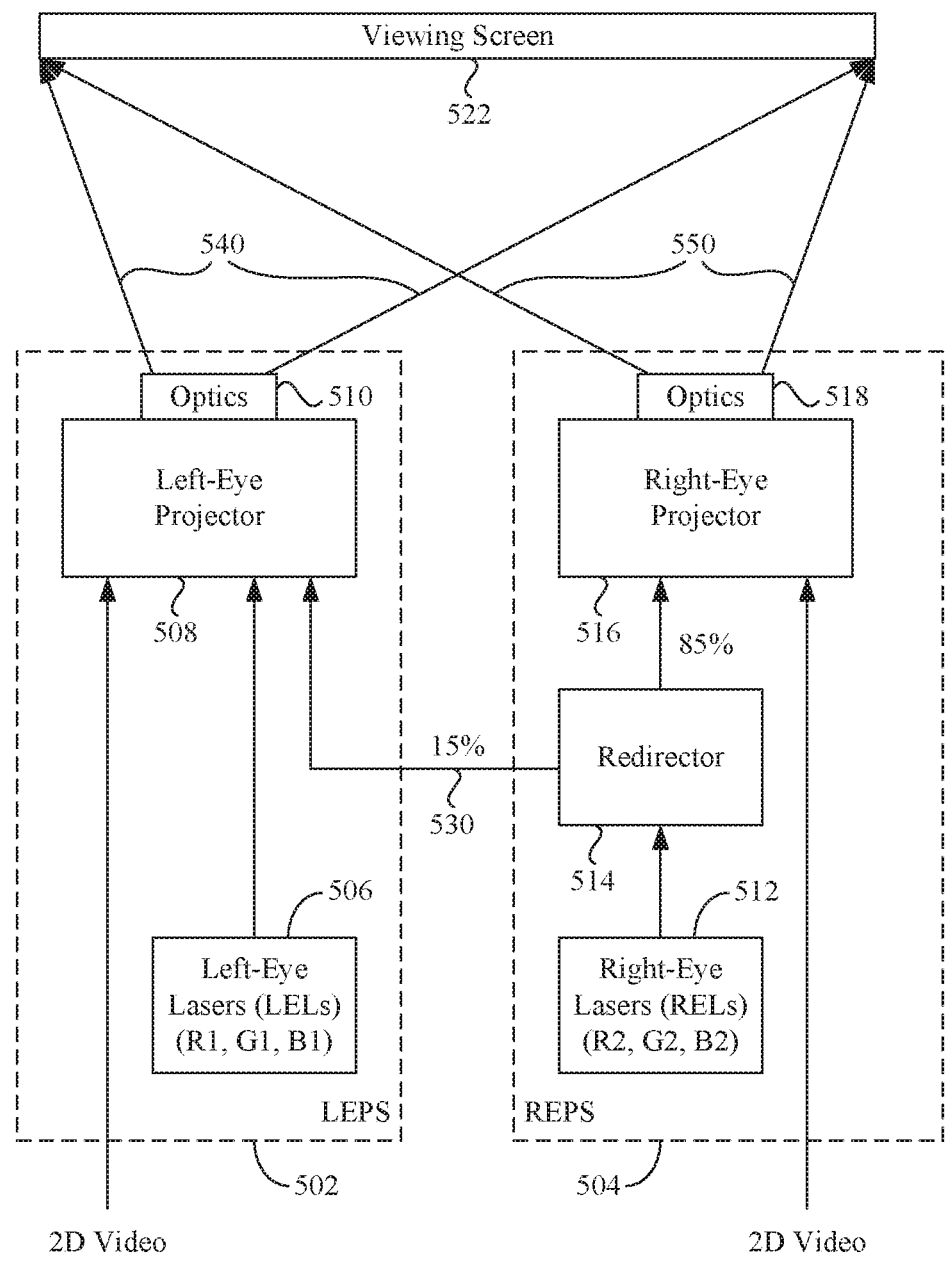
FIG. 5B shows the 3D projection system of FIG. 5A operating in 2D mode.

FIG. 5B shows projection system 500 operating in 2D mode. Accordingly, LEPS 502 and REPS 504 are receiving 2D image data on their inputs. Because projection system 500 is operating in 2D mode, redirector 514 is redirecting some of the laser light (approximately 15% in this instance) to LEPS 502 via a light path 530. The remainder of the light from RELs 512 (e.g., approximately 85%) is transferred to right-eye projector 516. Projector 508 modulates the light it receives from LELs 506 along with the light it receives from RELs 512 via light path 530, and generates highlighted 2D images on viewing screen 522 via highlighted imaging beam 540. Projector 516 of REPS 504 also modulates the remainder of the light it receives from RELs 512 via redirector 514 and projects un-highlighted 2D images on screen 522 via a second imaging beam 550. In this embodiment, only the images from LEPS 502 include highlighting. However, in other embodiments where LEPS 502 also includes a redirector, REPS 504 can be configured to generate highlighted images. As above, in 2D mode, no glasses are needed for viewing.

Figure 6:
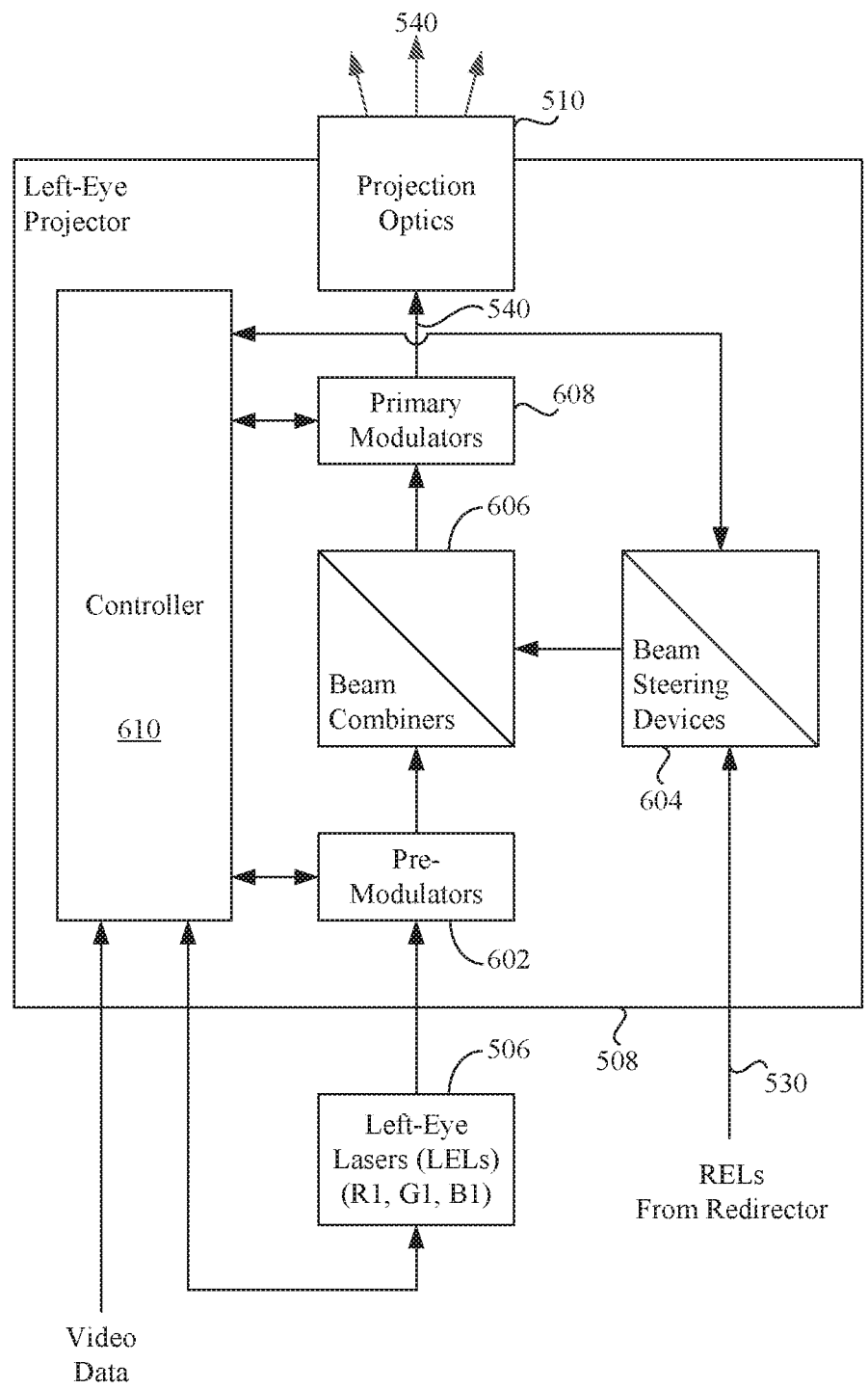
FIG. 6 shows the left-eye projector of FIGS. 5A-5B in greater detail.

FIG. 6 is a block diagram showing left-eye projector 508 (FIGS. 5A-5B) in greater detail. Projector 508 includes a pre-modulator 602, a beam steering device 604, a beam combiner 606, a primary modulator 608, and a controller 610. These components operate similarly to the corresponding components of FIG. 3, except that beam steering device 604 receives light from RELs 512 via optical path 530. Like in FIG. 3, a pre-modulator 602, a beam steering device 604, a beam combiner 606, and a primary modulator 608 are shown for only one color channel of left-eye projector 508. However, it will be understood that left-eye projector 508 will include iterations of these components for each color band (e.g., one for red, one for green, and one for blue.) Additionally, while light paths are shown traversing optical elements, it will be understood that reflective optical elements (e.g., pre-modulators 602, beam steering devices 604, and primary modulators 608, etc.) can be used.

Figure 7:
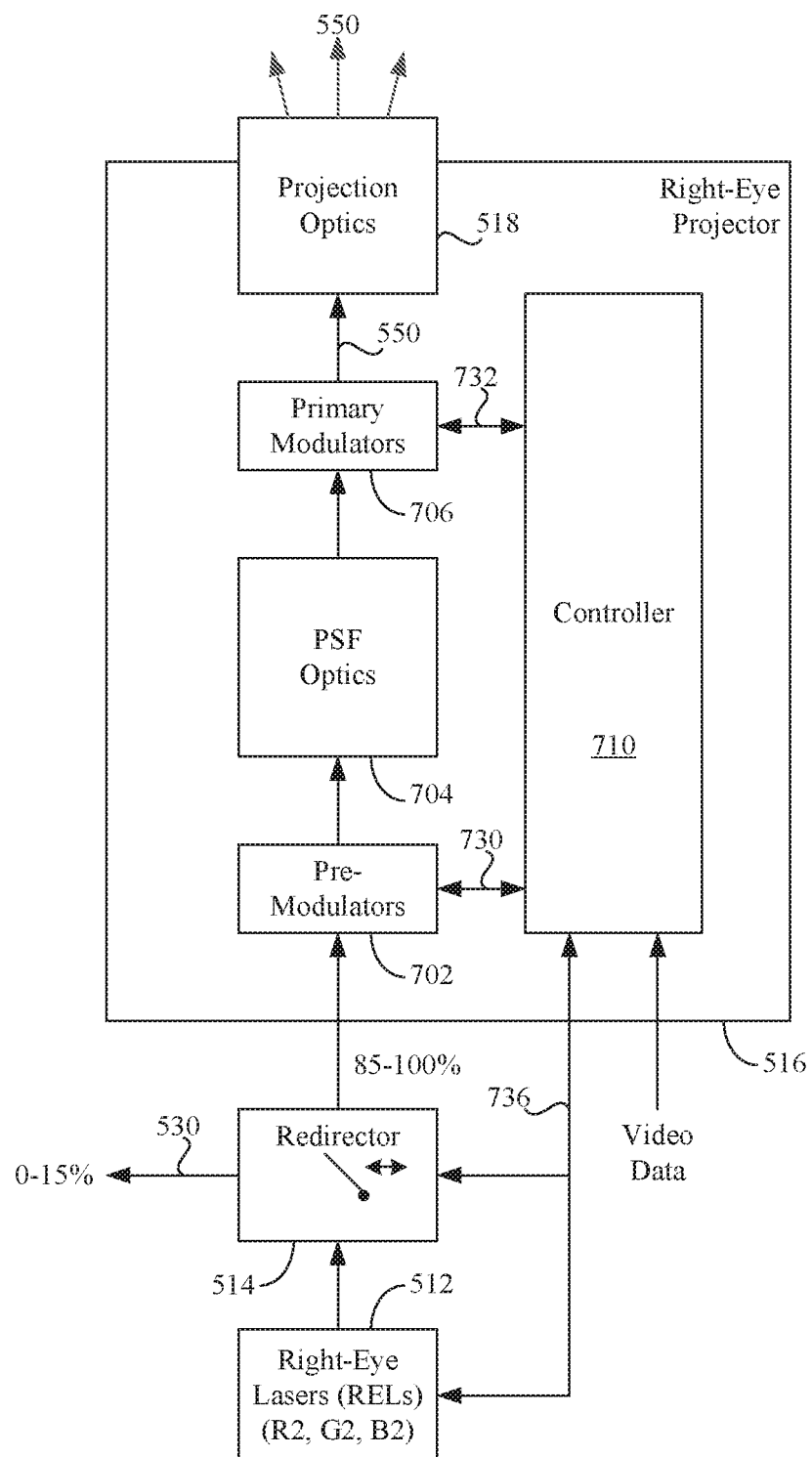
FIG. 7 shows the redirector and right-eye projector of FIGS. 5A-5B in greater detail.

FIG. 7 is a block diagram showing redirector 514 and right-eye projector 516 of FIGS. 5A-5B in greater detail. Here redirector 714 is implemented to redirect a desired amount of light (e.g., 0-15%, etc.) from RELs 512 to LEPS 502. Accordingly, the rest of the light (e.g., 85-100%, etc.) is transferred to right-eye projector 516. In a particular embodiment, redirector 714 comprises mechanically-switched mirrors that move in and out of the path of the illumination beam from RELs 512 to selectively transfer light to optical path 530. Light can be transferred between RELS 512 and LEPS 502 via optical path 530 using free-space beams, switched fiber optic cables, etc.

FIG. 7 further shows that right-eye projector 516 includes a pre-modulator 702, PSF optics 704, a primary modulator 706, projection optics 518, and a controller 710. Pre-modulator 702, primary modulator 706, and projection optics 518 perform the same general functions as the related elements described above in FIG. 6, with the exception that highlighting are not provided by right-eye projector 516. Additionally, PSF optics 704 provide a desired light field to primary modulator 706 but, in this embodiment, does not include a beam combiner. In an alternative embodiment, however, light from LELs 506 can be transferred to right-eye projector 516 and right-eye projector 516 can include the components shown in FIG. 6 to implement highlighting of 2D imaging beam 550. Finally, controller 710 provides control and coordination of pre-modulator 702, primary modulator 706, redirector 514, and RELs 512 via respective data and control paths 730, 732, and 736.

Figure 8:
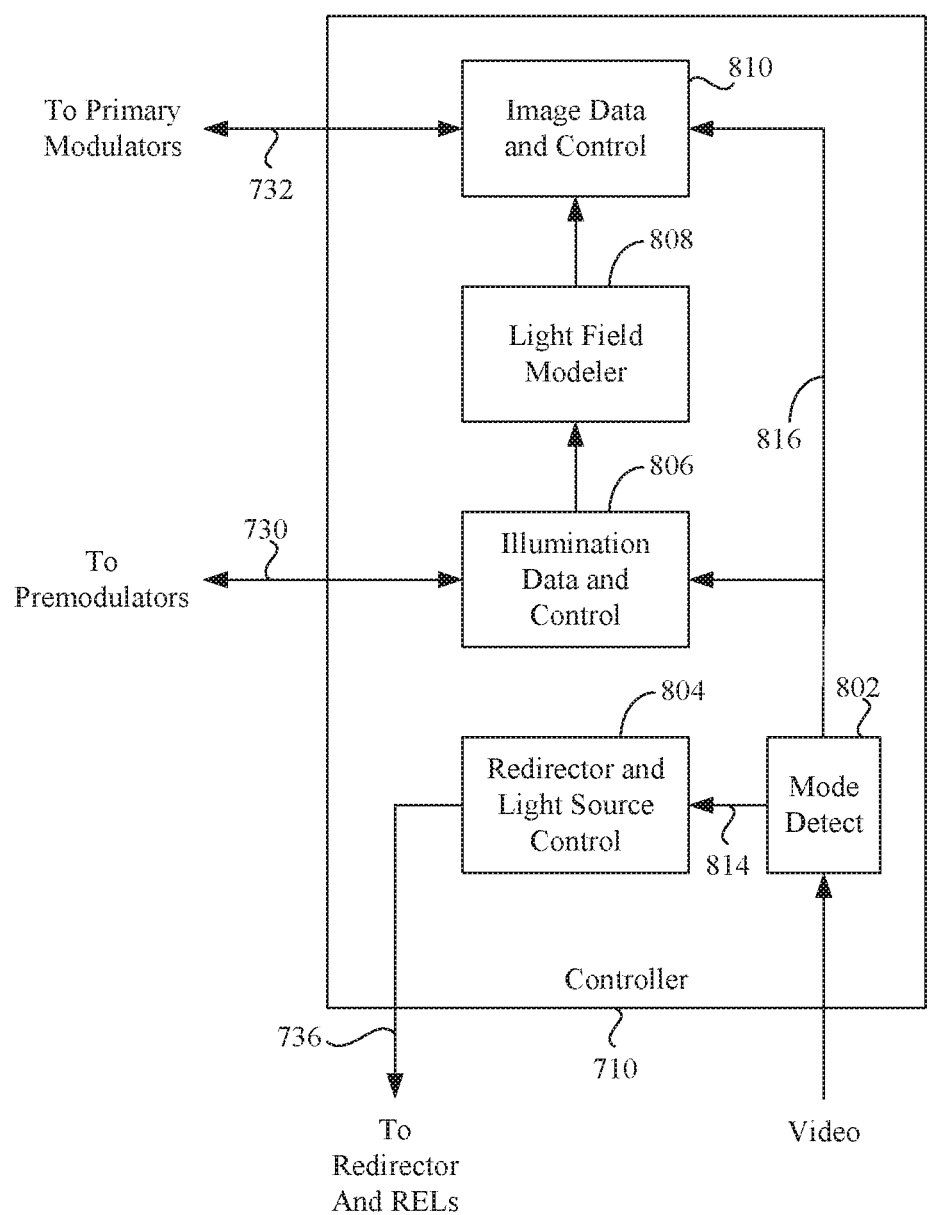
FIG. 8 shows the controller of FIG. 7 in greater detail.

FIG. 8 is a block diagram showing controller 710 in greater detail according to an exemplary embodiment of the invention. Controller 710 includes a mode detect module 802, a redirector and light source control module 804, an illumination data and control module 806, a light field modeler 808, and an image data and control module 810. The modules and associated functionality of controller 810 can be implemented using hardware, software, firmware, or some combination thereof as described above with respect to controller 310.

Mode detect module 802 enables right-eye projector 516 to determine if it is operating in 2D or 3D mode. Mode detect module 802 notifies light source control module 804 of the display mode via communication pathway 814. Mode detect module 802 further communicates the display mode and/or image data to the other modules of controller 710 via communication pathway 816.

Redirector and light source control module 804 controls redirector 714 and, optionally, RELs 512. When mode detect module 802 indicates 2D mode, module 804 causes redirector 514 to transfer light from RELs 512 to LEPS 502 via optical path 530. Module 804 can also turn RELs 512 on and off at the appropriate times (e.g., when 2D or 3D image data is present on the video data input right-eye projector 514, etc.).

Illumination and data control module 806 receives the image data, analyzes the image data, and then outputs illumination data and control signals to pre-modulator 702 via data and control path 730, so that pre-modulator 702 will modulate the illumination beam from redirector 514 in a desired way for dual modulation. In some embodiments, module 806 utilizes the mode detection information from module 802 to optionally adjust how light is modulated by pre-modulators 702. For example, module 806 might adjust how the illumination beam is modulated by pre-modulators 702 to compensate for the light being transferred out of REPs 504 via optical path 730 in 2D mode.

The illumination data and/or control signals generated by module 806 are also provided to light field modeler 808, which utilizes the data to generate light field model representing the light that will impinge on the modulating surface of primary modulator 706. Light field modeler 808 outputs the modeled light field to image and data control module 410. Optionally, light field modeler 808 can adjust how it models the light field based on the display mode and expected illumination provided by RELs 512.

Image data and control module 810 receives the modeled light field and the image data, and then adjusts the image data based on the modeled light field. Module 410 generates adjusted image data in both 2D and 3D modes, and outputs the adjusted image data to primary modulator 706 via control path 732.

FIGS. 5-8 illustrate an embodiment of the invention where LEPS 502 and REPS 504 can be inexpensively retrofitted for highlight projection. For example, the PSF optics section of LEPS 502 can be upgraded to include beam steering device 604 and/or beam combiner 606 along with a port for admitting light via optical path 530. Similarly, REPS 504 can be readily modified to include redirector 514 by upgrading its light source stage. Thus, the projection system shown in FIGS. 5-8 efficiently adds highlighting to the 2D images from LEPS 502 using light from an existing light source of REPS 504. Any reduction in brightness in the images projected by imaging beam 550 from REPs 504 due to such light transfer is more than made up for by the increased peak brightness level of the highlighted imagery from LEPS 502.

Figure 9:
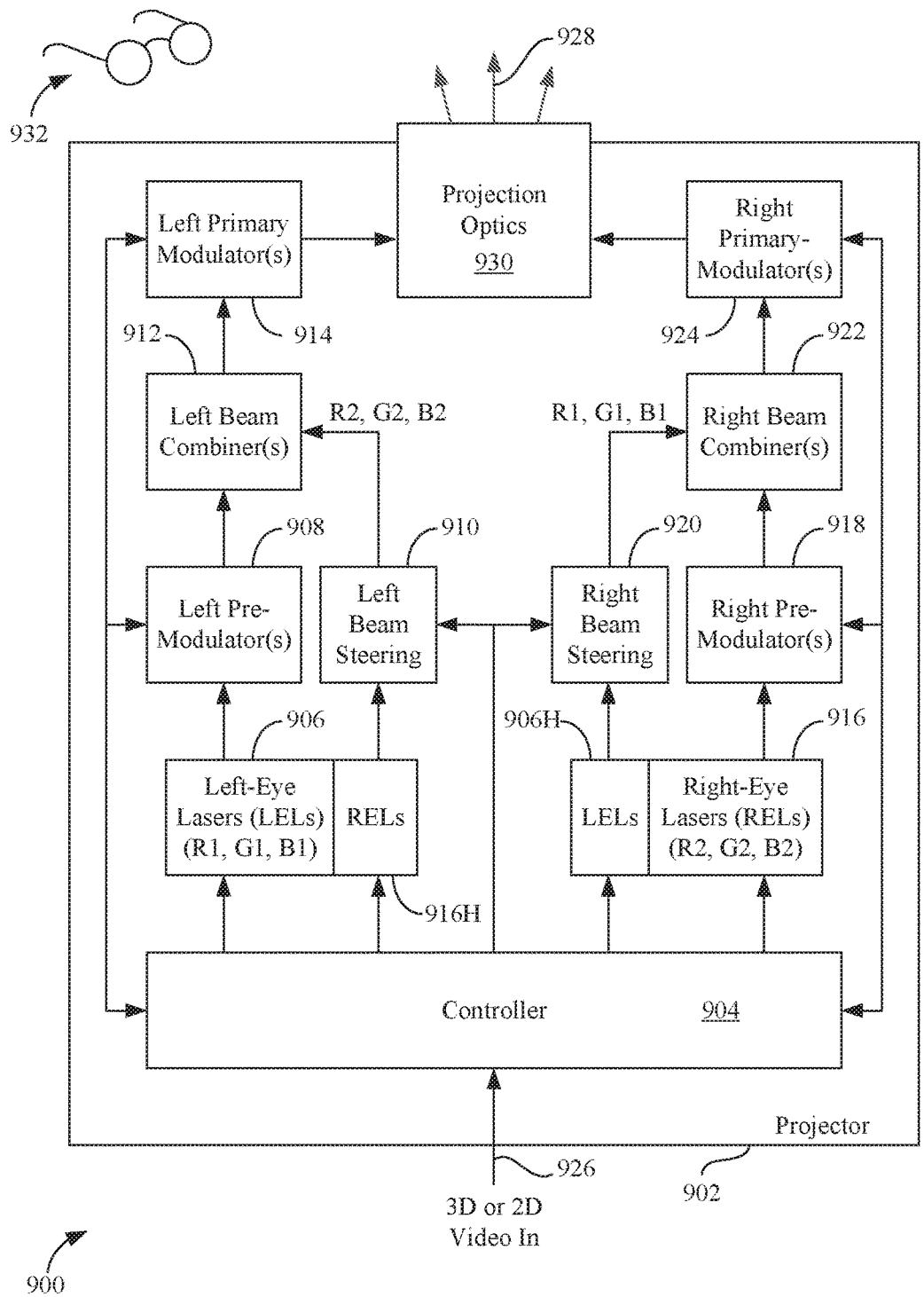
FIG. 9 shows a 3D projection system according to yet another embodiment of the invention.

FIG. 9 is a block diagram showing a projection system 900 according to yet another embodiment of the invention. Projection system 900 can selectively operate in 3D or 2D modes, and its components are housed within the same projector housing 902. Projection system 900 includes a controller 904, a set of left-eye lasers (LELs) 906 that emit a first set of primary lights (e.g., R1, G1, B1) having first spectral characteristics, left pre-modulators 908, left beam steering devices 910, left beam combiners 912, and left primary modulators 914. Projection system 900 also includes a set of right-eye lasers (RELs) 916 that emit a second set of primary lights (e.g., R2, G2, B2) having second spectral characteristics that are different (e.g., have different spectral bands) than the spectral characteristics of LELs 906, right pre-modulators 918, right beam steering devices 920, right beam combiners 922, and right primary modulators 924.

Controller 904 implements 3D projection when 3D video (image) data is received on its data input 926. In 3D mode, the "left" components generate left-eye views of 3D images present in 3D image data as described above with reference to FIGS. 2-4. Similarly, the "right" components generate right-eye views of 3D images present in the 3D image data in the same way. Controller 904 drives the components of projection system 900 to cause an imaging beam 928, comprising sequential left- and right-eye views, to be output by projection optics 930. As before, spectral 3D glasses 932 similar to spectral glasses 110 (FIG. 1) provide spectral separation of the left- and right-eye views for viewers in the audience.

Projection system 900 also includes a set of highlight RELs 916H and a set of highlight LELs 906H for highlighting 2D images in 2D mode. (Optionally, LELs 906H and RELs 916H can comprise designated ones of LELs 906 and RELs 916, respectively, instead of additional light sources.) When 2D images are displayed using the "left" componentry, controller 904 adds highlights to the 2D images by energizing RELs 916H and controlling left beam steering devices 910 as described above in FIGS. 2-4. Similarly, when 2D images are displayed using the "right" componentry, controller 904 adds highlights to the 2D images by energizing LELs 906H and controlling right beam steering devices 920 as discussed above. In some cases, the "left" and "right" componentry can be driven in alternation in 2D mode so that any highlighting added to the images do not overheat one of the primary modulators 914 and 924. Projection system 900 thus can selectively project 2D images with highlights or 3D images from a single projector.

Figure 10:
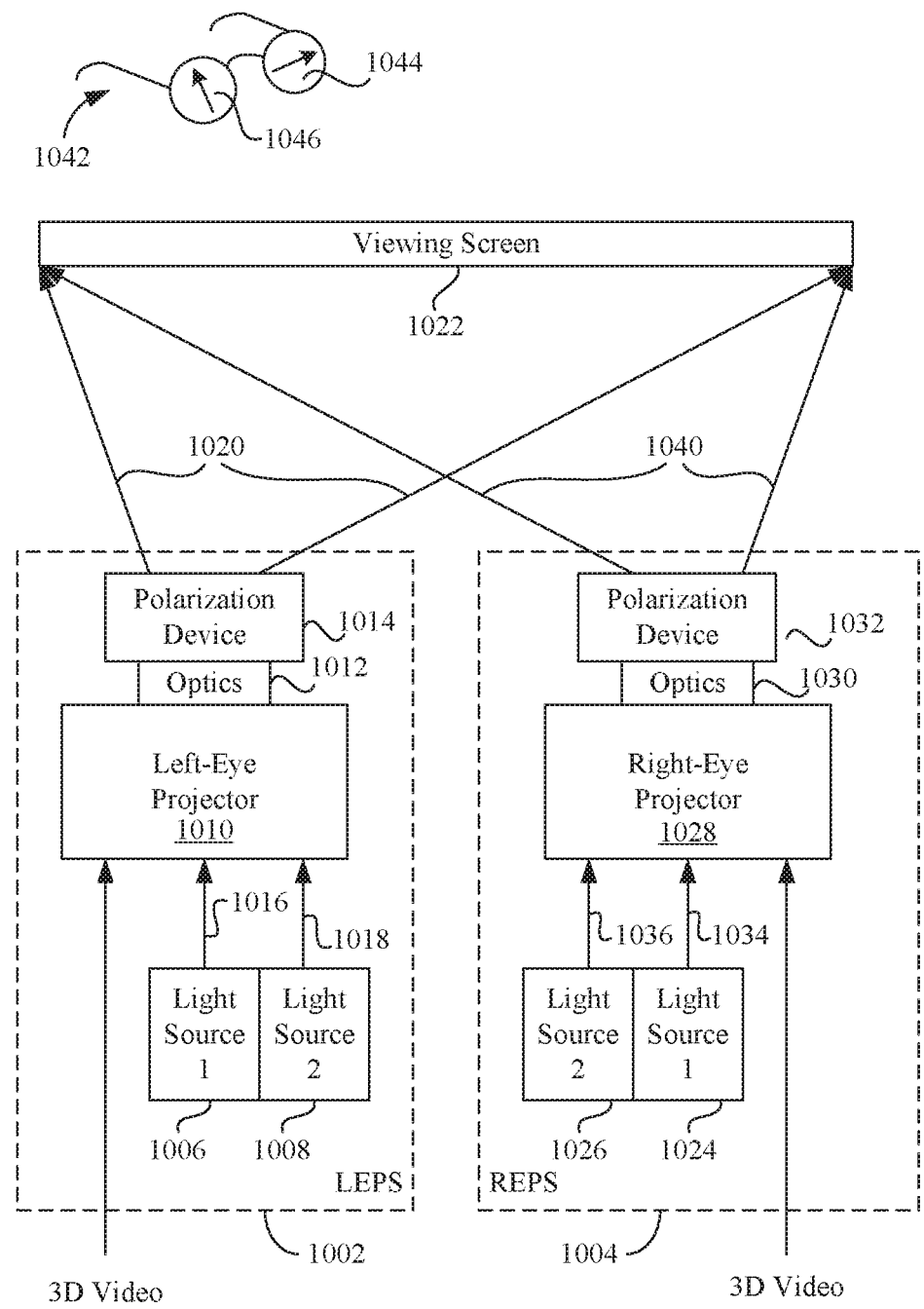
FIG. 10 shows a 3D projection system according to still another embodiment of the invention.

FIG. 10 is a block diagram showing a 3D projection system 1000 according to yet another embodiment of the invention. Projection system 1000 facilitates highlighting each of the individual left-eye and right-eye views of a 3D image. 3D projection system 1000 can be a dedicated 3D projection system for only displaying 3D images, or alternatively, 3D projection system 1000 can also have the ability to display and selectively highlight 2D images.

3D projection system 1000 includes both a left-eye projection system (LEPS) 1002 and a right-eye projection system (REPS) 1004, which generate left-eye and right-eye 3D views, respectively. LEPS 1002 includes two light sources 1006 and 1008. Light sources 1006 and 1008 can be embodied in two sets of primary lights, two white light sources, etc. LEPS 1002 also includes a left-eye projector 1010, left-eye projection optics 1012, and a left-eye polarization device 1014. Left-eye projector 1010 houses modulators and optics that modulate the illumination beams 1016 and 1018 provided by light sources 1006 and 1008, respectively, according to left-eye images present in the 3D video data. Projector 101 also projects a left-eye imaging beam 1020, which is infused with the left-eye images, onto viewing screen 1022 via projection optics 1012 and a polarization device 1014. Projection optics 1012 focus the left-eye imaging beam 1020 on viewing screen 1022. Polarization device 1014 imparts a first polarization state on the left-eye imaging beam 1020, which is used for image separation.

REPS 1004 also includes two light sources 1024 and 1026. Light sources 1024 and 1026 can be embodied in two sets of primary lights, two white light sources, etc. They can also be the same or different than the light sources 1006 and 1008. In a particular embodiment, light sources 1006 and 1024 comprise a first plurality of primary lights (e.g., R1, G1, B1) and light sources 1008 and 1026 comprise a second plurality of primary lights (e.g., R2, G2, B2), which have different red, green, and blue spectral bands than the first plurality of primary lights.

REPS 1004 also includes a right-eye projector 1028, right-eye projection optics 1030, and a right-eye polarization device 1032. Right-eye projector 1028 houses modulators and optics that modulate the illumination beams 1034 and 1036 provided by light sources 1024 and 1026, respectively, according to right-eye images present in the 3D video data. Projector 1028 also outputs a right-eye imaging beam 1040, which is infused with the right-eye images, for projection onto viewing screen 1022 via right-eye projection optics 1030 and a right-eye polarization device 1032. Right-eye projection optics 1030 focus the right-eye imaging beam 1040 on viewing screen 1022, and right-eye polarization device 1032 imparts a second polarization state on the right-eye imaging beam 1040 that is orthogonal to the first polarization state of imaging beam 1020.

The orthogonal polarization states of imaging beams 1020 and 1040 facilitate separation of the left-eye and right-eye views for the viewers in the audience. These orthogonal polarization states can be either linear (e.g., vertical and horizontal) or circular (e.g., left and right handed). Polarized 3D glasses 1042 are worn by the audience members. The glasses 1042 have polarized lenses 1044 and 1046, with the left-eye lens 1044 having the first polarization state and the right-eye lens 1046 having the second polarization state.

Because polarization of an imaging beam diminishes light output significantly, each of the polarization devices 1014 and 1032 can be a "light doubler". A light doubler is a device that splits an imaging beam into two orthogonally-polarized beams, and then converts the polarization of one of the split beams to match the other split beam. The split beams can then be projected as a one imaging beam with one polarization state. One such light doubler is the "RealD XL" system made by RealD. Accordingly, the orthogonal polarization states can be imparted on each of imaging beams 1020 and 1040 by respective light doublers 1014 and 1032, which increases the brightness perceived by the audience.

As indicated above, the left-eye projector 1010 and the right-eye projector 1028 advantageously add highlights to the right-eye and left-eye imaging beams 1020 and 1040, respectively. The addition of such highlights significantly increases the peak brightness of the left-eye and right-eye views projected on viewing screen 1022 over a 3D projection system without highlighting as indicated above. This allows media creators to develop image content that appears more realistic and pleasing to the viewers.

Figure 11:
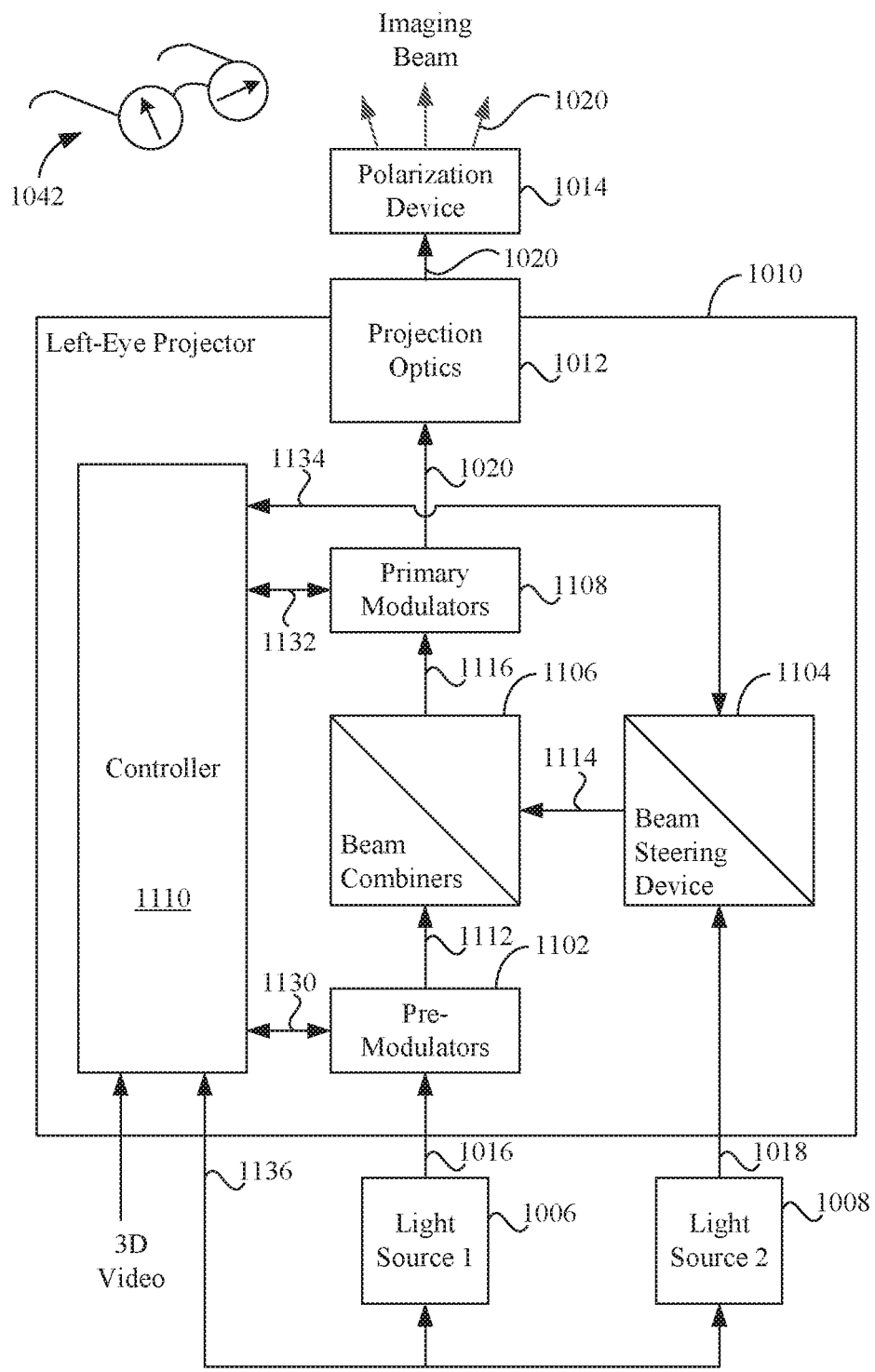
FIG. 11 shows the left-eye projector of FIG. 10 in greater detail.

FIG. 11 is a block diagram showing left-eye projector 1010 (FIG. 10) in greater detail according to an exemplary embodiment of the invention. The structure and operation of right-eye projector 1028 is substantially similar to left-eye projector 1010, with the exceptions of the differences noted herein.

Left-eye projector 1010 includes a pre-modulator 1102, a beam steering device 1104, a beam combiner 1106, a primary modulator 1108, and a controller 1110. These components operate similarly to the corresponding components of FIG. 3, except that pre-modulator 1102 and beam steering device 1104 receive illumination beams 1016 and 1018 from first and second light sources 1006 and 1008, respectively. Like in FIG. 3, only one of each of pre-modulator 1102, beam steering device 1104, beam combiner 1106, and primary modulator 1108 are shown for an exemplary color channel of left-eye projector 1010. However, it will be understood that left-eye projector 1010 can include multiple (e.g., 3) iterations of these components for each color band (e.g., one for red, one for green, and one for blue) of the illumination beams 1016 and 1018. Additionally, while light paths are shown passing through some reflective optical elements (e.g., pre-modulators 1102, beam steering devices 1104, and primary modulators 1108, etc.), it will again be understood that these optical elements might instead reflect light from their modulating surfaces.

The components of left-eye projector 1010 function as follows to facilitate highlighting of desired regions of left-eye images present in imaging beam 1020. Controller 1110 selectively energizes light sources 1006 and 1008 via a control path 1136 to selectively generate illumination beams 1016 and 1018, respectively. Pre-modulator 1102 receives illumination data for each left-eye view from controller 1110 via control path 1130 and modulates illumination beam 1016 accordingly to generate a modulated illumination beam 1112. Beam steering device 1104 receives highlight data generated by controller 1110 via control path 1134. Beam steering device 1104 also receives second illumination beam 1018 from second light source 1008, steers portions of the illumination beam 1018 (e.g., by phase retardation, etc.) toward desired highlight regions of primary modulator 1108, and outputs a steered illumination beam 1114. Modulated illumination beam 1112 and steered illumination beam 1114 are then combined by beam combiner 1106 and provided to primary modulator 1108 as a combined illumination beam 1116. Primary modulator 1108 modulates the combined illumination beam 1116 according to adjusted left-eye image data provided it from controller 1110 on control path 1132. As in FIG. 4, the adjusted image data has been generated based on a modeled light field associated with modulated illumination beam 1112 and, optionally, further based on the highlight data provided to beam steering device 1104. However, in this embodiment, the adjusted image data is associated with a left-eye view of a 3D image.

Primary modulator 1108 then outputs a highlighted, dual-modulated imaging beam 1020 to projection optics 1012, where it is focused on viewing screen 1022 through polarization device 1014. As indicated above, polarization device 1014 imparts a first polarization state on imaging beam 1020, which is orthogonal to the polarization state imparted on imaging beam 1040. In a particular embodiment, polarization device 1014 is a "light doubler" device as described above.

Right-eye projector 1028 includes substantially the same components as left-eye projector 1010. Accordingly, right-eye projector 1028 facilitates the addition of highlights to right-eye images infused in right-eye imaging beam 1040. As mentioned above, right-eye imaging beam 1040 is infused with an orthogonal polarization state as left-eye imaging beam 1020, so that the left-eye and right-eye images (and associated highlighting) can be resolved by polarized 3D glasses 1042

Methods of the present invention will now be described with reference to FIGS. 12-16. For the sake of clear explanation, these methods might be described with reference to particular elements of the previously-described embodiments. However, it should be noted that other elements, whether explicitly described herein or created in view of the present disclosure, could be substituted for those cited without departing from the scope of the present invention. Therefore, it should be understood that the methods of the present invention are not limited to any particular elements that perform any particular functions. Furthermore, some steps of the methods presented herein need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 12:
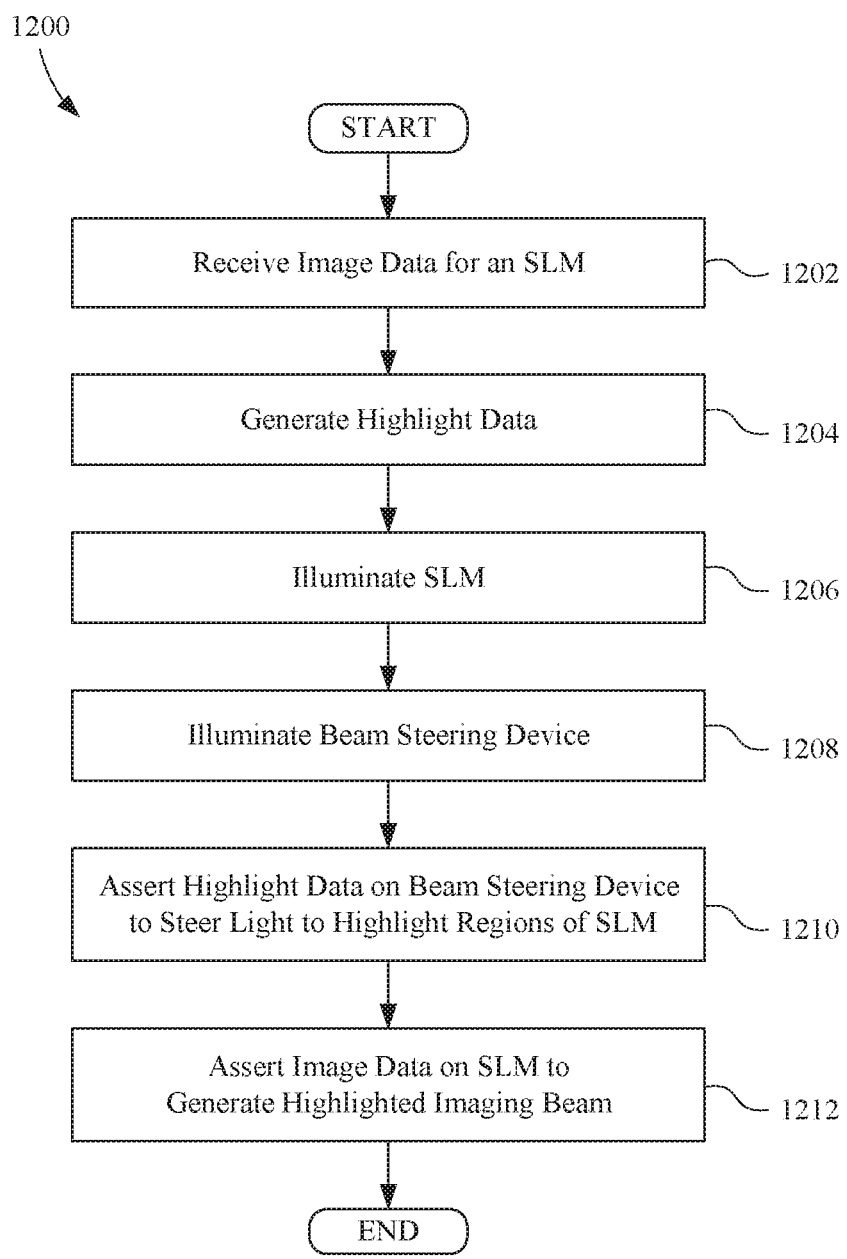
FIG. 12 is a flowchart summarizing a method for displaying 2D image data with a 3D projection system according to the invention.

FIG. 12 is a flowchart summarizing an exemplary method 1200 for displaying image data with a projection system having a first light source and a second light source. In a first step 1202, image data to be displayed on a spatial light modulator (SLM) is received. Then, in a second step 1204, highlight data is generated based on the image data. In a third step 1206, the SLM is illuminated with light from the first light source, and in a fourth step 1208, a beam steering device is illuminated with light from the second light source. In a fifth step 1210, the highlight data is asserted on the beam steering device to steer light from the second light source to highlight regions of the SLM based on the highlight data. In a sixth step 1212, the image data is asserted on the SLM to modulate light from the first light source and light from the second light source to generated a highlighted imaging beam.

Figure 13:
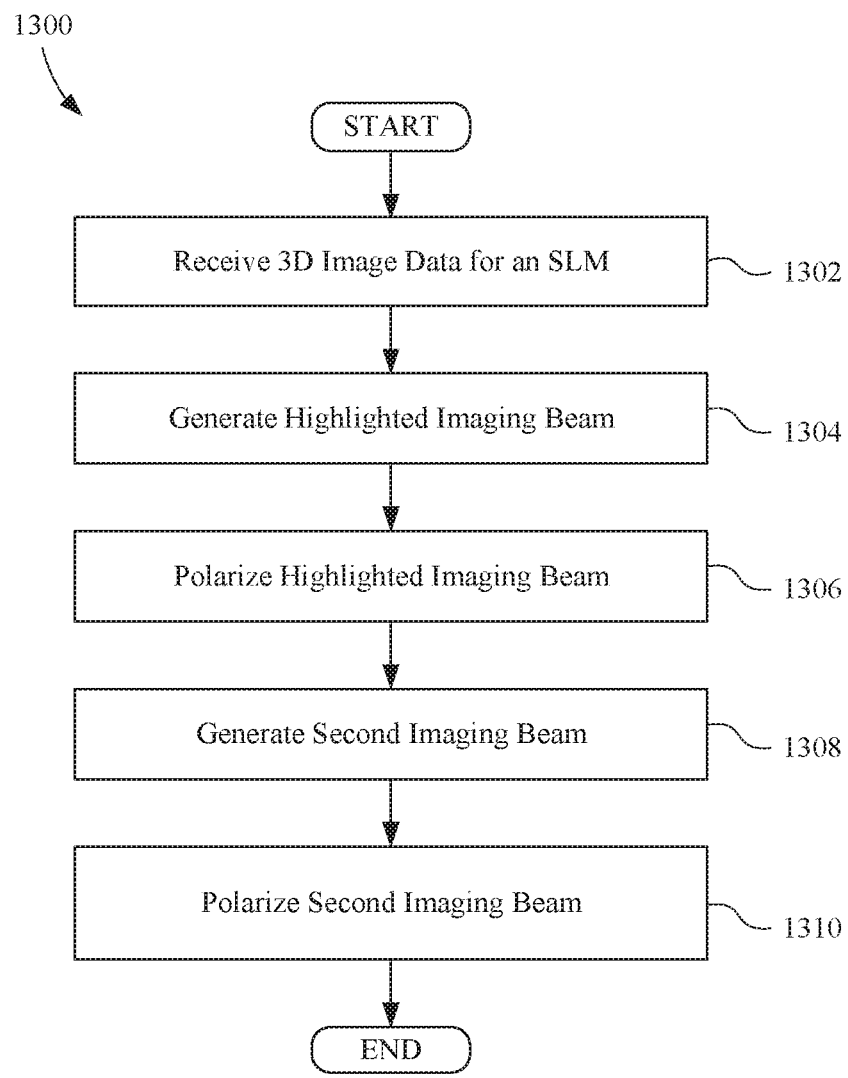
FIG. 13 is a flowchart summarizing a method for providing highlighted 3D views in a 3D projection system according to the invention.

FIG. 13 is a flowchart summarizing an exemplary method 1300 for providing highlighted views in a 3D projection system. In a first step 1302, 3D image data to be displayed on an SLM is received, and in a second step 1304, a highlighted imaging beam associated with a first-eye view present in the 3D image data is generated. In a third step 1306, the highlighted beam is polarized in a first polarization state. In a fourth step 1308, a second imaging beam associated with a second-eye view present in the 3D image data is generated, and in a fifth step, the second imaging beam is polarized in a second polarization state that is different (e.g., orthogonal to) the first polarization state.

The highlighted imaging beam can be generated by generating highlight data based on a portion of the 3D image data associated with the first-eye view, illuminating the SLM with light from a first light source, illuminating a beam steering device with light from a second light source, using a beam steering device to steer light from the second light source to highlight regions of the SLM based on the highlight data, and asserting 3D image data associated with the first-eye view on the SLM to modulate light from the first light source and light from the second light source to generate the highlighted imaging beam.

Figure 14:
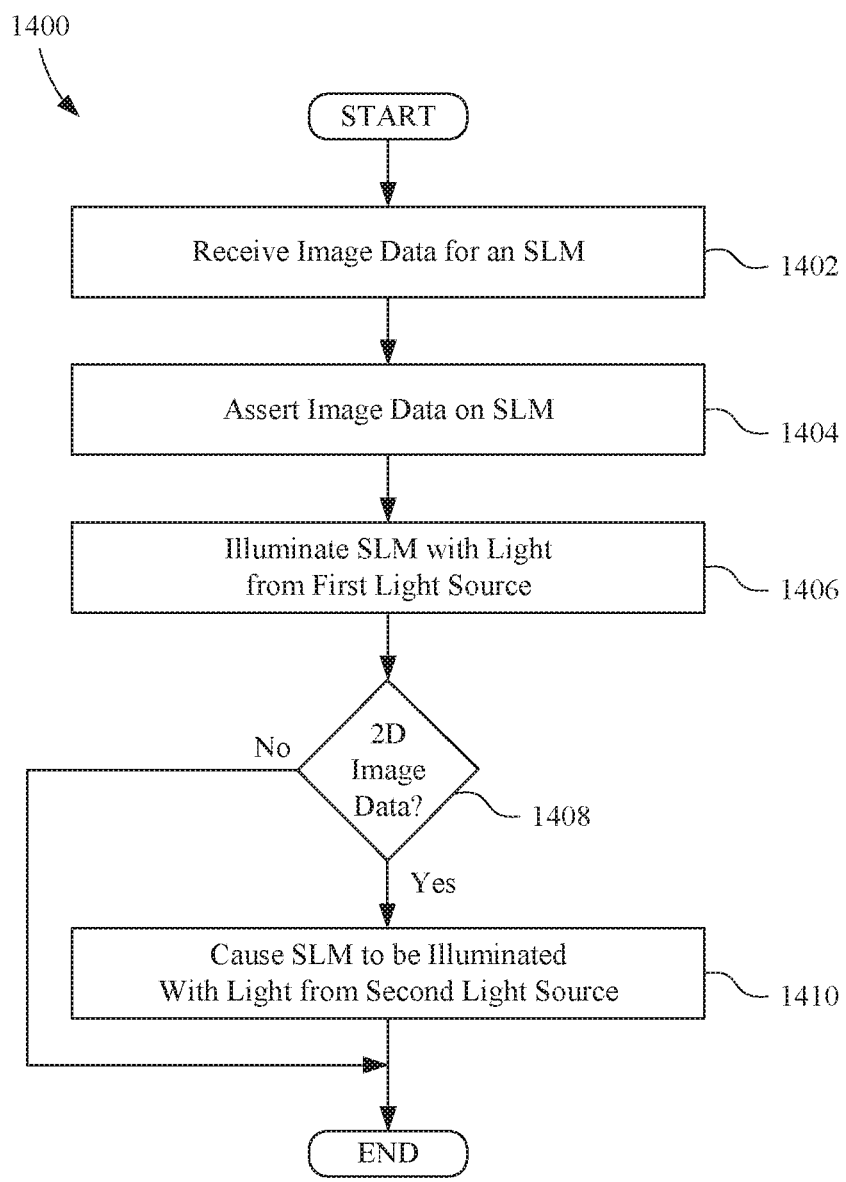
FIG. 14 is a flowchart summarizing another method for displaying 2D image data with a 3D projection system according to the invention.

FIG. 14 is a flowchart summarizing a method 1400 for displaying 2D image data with a 3D projection system having a first light source associated with a first-eye view present in 3D image data and a second light source associated with a second-eye view present in the 3D image data, where the first and second light sources have different spectral characteristics. In a first step 1402 image data to be displayed by an SLM is received, and in a second step 1404, the image data is asserted on the SLM. In a third step 1406, the SLM is illuminated by light from the first light source. In a fourth step 1408, it is determined whether the image data comprises 2D or 3D image data and, in a fifth step 1410, if the image data is determined to be 2D image data, then the SLM is caused to be further illuminated by light from the second light source. However, if in fourth step 1408, it is determined that the image data is 3D image data, then method 1400 ends.

Figure 15:
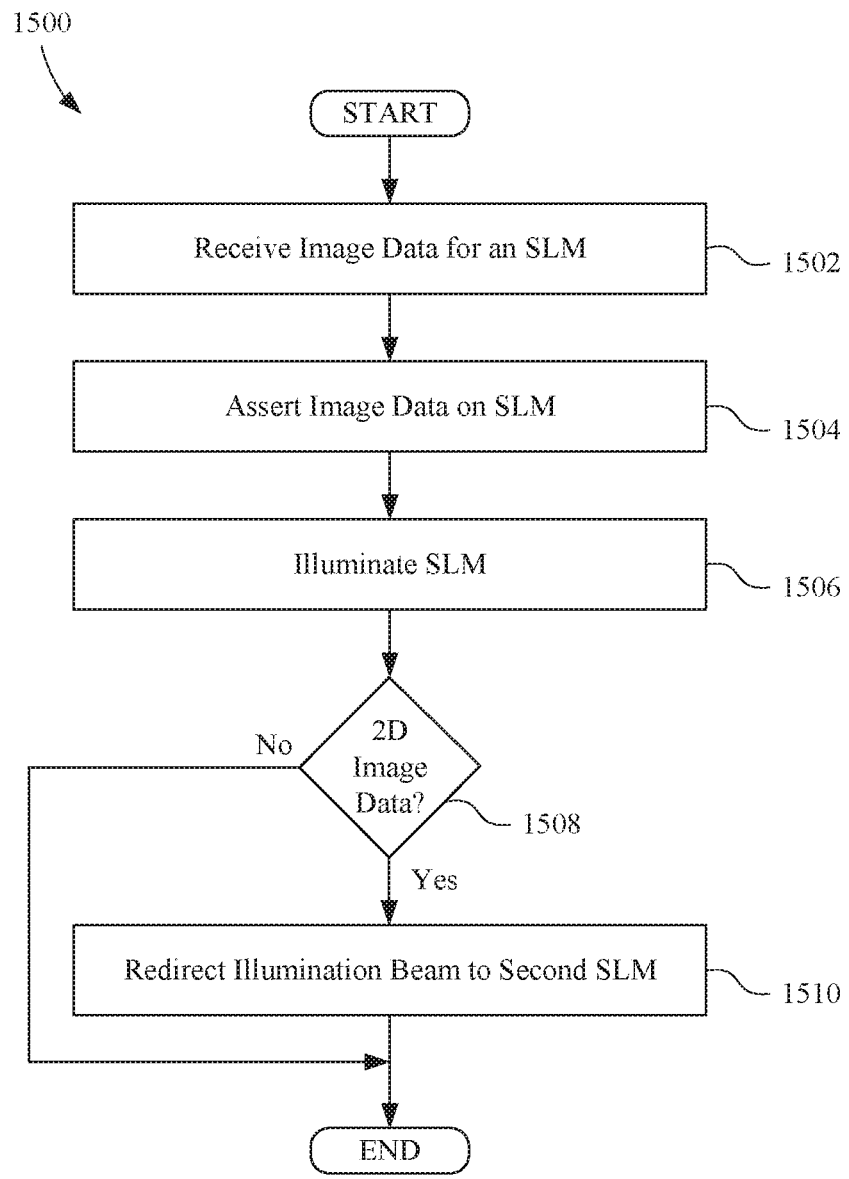
FIG. 15 is a flowchart summarizing yet another method for displaying 2D image data with a 3D projection system according to the invention.

FIG. 15 is a flowchart summarizing another method 1500 for displaying 2D image data with a 3D projection system having a first light source associated with a first-eye view present in 3D image data and a second light source associated with a second-eye view present in 3D image data, where the first and second light sources have different spectral characteristics. In a first step 1502 image data to be displayed by an SLM is received, and in a second step 1504, the image data is asserted on the SLM. In a third step 1506, the SLM is illuminated with an illumination beam from one of the first light source and the second light source. In a fourth step 1508, it is determined whether the image data comprises 2D or 3D image data and, in a fifth step 1510, if the image data is determined to be 2D image data, then at least a portion of the illumination beam is redirected from the SLM to a second SLM configured to have 2D image data asserted thereon. However, if in fourth step 1508, it is determined that the image data is 3D image data, then method 1500 ends.

Figure 16:
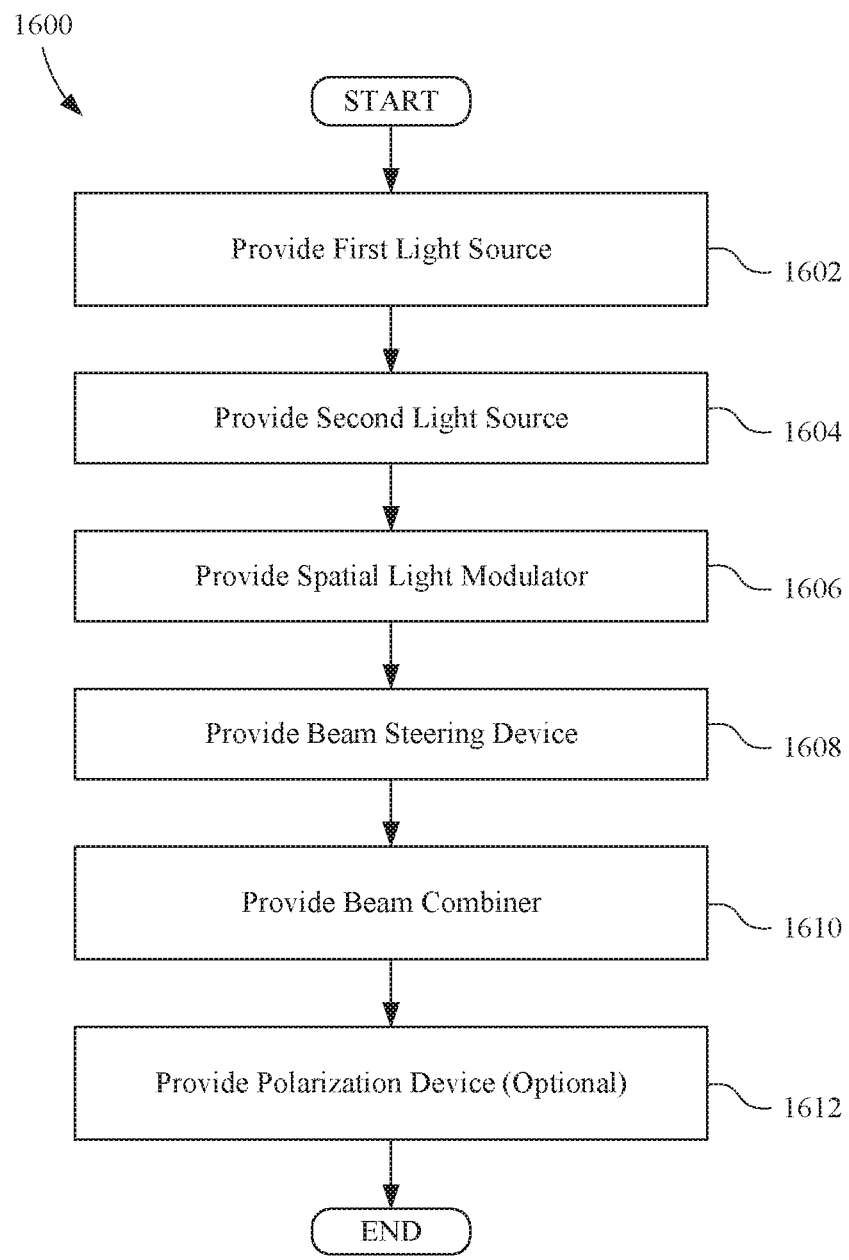
FIG. 16 is a flowchart summarizing a method of manufacturing a projection system according the present invention.

FIG. 16 is a flowchart summarizing a method 1600 for manufacturing a projection system according to the present invention. In a first step 1602 a first light source is provided, and in a second step 1604 a second light source is provided. In a third step 1606, a spatial light modulator (SLM) is provided, is disposed to receive light from at least one of the first light source and the second light source, and is operative to modulate light to generate an imaging beam. In a fourth step 1608, a beam steering device is provided, is disposed to receive light from the second light source, and is operative to controllably steer light from the second light source toward selected regions of the SLM. In a fifth step 1610, a beam combiner is provided and is disposed to receive the light from the first light source and the steered light from the beam steering device. The beam combiner is also operative to combine the light from the first light source and the steered light from the second light source and provide the combined light to the SLM. In an optional sixth step 1612, a polarization device (e.g., a light doubler) is provided and disposed in an imaging beam path of the SLM.

The description of particular embodiments of the present invention is now complete. Many of the described features may be substituted, altered or omitted without departing from the scope of the invention. For example, each projector can include a redirector (e.g., like redirector 514) so that light from either left or right projectors can be input to the other. As another example, alternative highlighting routines may be employed (e.g., giving priority to highlighting in the center of the image, etc.) in addition to, or as a substitute for, the ones described above. As still another example, the highlighting components and routines discussed herein can be implemented in a projection system that is dedicated to displaying only 2D imagery. These and other deviations from the particular embodiments shown will be apparent to those skilled in the art, particularly in view of the foregoing disclosure.

Various aspects of the present invention may be appreciated from the following enumerated example embodiments (EEEs):

EEE 1. A projection system comprising:
   an image data input operative to receive image data;
   a first light source operative to emit a first illumination beam;
   a second light source operative to emit a second illumination beam;
   a spatial light modulator (SLM) disposed to receive light from said first light source and being operative to modulate said light from said first light source based on said image data to generate an imaging beam;
   a controller coupled to receive said image data and being operative to generate highlight data based on said image data, to provide said image data to said SLM, and to output said highlight data;
   a beam steering device coupled to receive said highlight data from said controller, said beam steering device disposed to receive at least a portion of said second illumination beam and being operative to steer said second illumination beam to highlight regions of said SLM based on said highlight data such that said SLM also modulates light from said second light source according to said image data to impart highlights in said imaging beam; and projection optics disposed in the path of said imaging beam and operative to focus said imaging beam on a viewing surface.

EEE 2. The projection system of EEE 1, wherein:
said first light source comprises a first set of primary lasers; and
said second light source comprises a second set of primary lights having a different spectral composition than said first set of primary lasers.

EEE 3. The projection system of EEE 1, wherein:
said first light source comprises a first white light source;
said second light source comprises a second white light source; and
said first white light source and said second white light source comprise different wavelength bands of red, green, and blue light.

EEE 4. The projection system of EEE 1, wherein said controller is operative to cause said second light source to be selectively energized responsive to said image data being received on said image data input.

EEE 5. The projection system of EEE 1, wherein the power of said second illumination beam provided to said beam steering device is approximately 15% of the power of said first illumination beam.

EEE 6. The projection system of EEE 1, wherein said beam steering device comprises a liquid crystal on silicon (LCOS) display.

EEE 7. The projection system of EEE 1, wherein said beam steering device comprises a deformable mirror device (DMD).

EEE 8. The projection system of EEE 1, further comprising a pre-modulator disposed in the path of said first illumination beam and being operative to modulate said first illumination beam to generate a modulated first illumination beam.

EEE 9. The projection system of EEE 8, further comprising a beam combiner disposed to receive said modulated first illumination beam and said second illumination beam and being operative to combine said modulated first illumination beam and said second illumination beam to generate a combined illumination beam and provide said combined illumination beam to said SLM.

EEE 10. The projection system of EEE 9, wherein said beam combiner comprises an optical thin film filter.

EEE 11. The projection system of EEE 8, wherein said controller is further operative to:
model a light field incident on said SLM based on said modulated first illumination beam; and
adjust said image data based on said light field prior to providing said 2D image data to said SLM.

EEE 12. The projection system of EEE 11, wherein said controller is further operative to model said light field incident on said SLM based on said highlight data.

EEE 13. The projection system of EEE 1, further comprising:
a second SLM disposed to receive light from said second light source and operative to modulate said light from said second light source based on said image data to generate a second imaging beam; and
a redirector disposed to receive said second illumination beam and selectively redirect some of said second illumination beam to said beam steering device prior to light from said second light source reaching said second SLM.

EEE 14. The projection system of EEE 1, wherein:
said image data input is configured to receive 3D image data or 2D image data;
said first light source is associated with a first-eye view present in said image data when said image data comprises 3D image data;
said second light source is associated with a second-eye view present in said image data when said image data comprises 3D image data; and
said second light source has different spectral characteristics than said first light source.

EEE 15. The projection system of EEE 14, wherein:
when said image data comprises 2D image data, said controller receives said 2D image data and is operative to generate said highlight data based on said 2D image data and provide said 2D image data to said SLM; and
when said image data comprises 2D image data, said SLM modulates said light from said first light source and said light from said second light source according to said 2D image data.

EEE 16. The projection system of EEE 1, wherein said image data comprises 2D image data.

EEE 17. The projection system of EEE 1, wherein said image data comprises 3D image data.

EEE 18. The projection system of EEE 1, further comprising a polarization device disposed in the path of said imaging beam and being operative to impart a polarization state on said imaging beam.

EEE 19. The projection system of EEE 18, wherein said polarization device comprises a light doubler.

EEE 20. A method for displaying image data with a projection system having a first light source and a second light source, said method comprising:
receiving image data to be displayed by a spatial light modulator (SLM);
generating highlight data based on said image data;
illuminating said SLM with light from said first light source;
illuminating a beam steering device with light from said second light source;
asserting said highlight data on said beam steering device to steer said light from said second light source to highlight regions of said SLM based on said highlight data; and
asserting said image data on said SLM to modulate said light from said first light source and said light from said second light source to generate a highlighted imaging beam.

EEE 21. The method of EEE 20, further comprising:
sometimes receiving 3D image data and other times receiving 2D image data; and
illuminating said beam steering device with light from said second light source responsive to receiving said 2D image data.

EEE 22. The method of EEE 20, further comprising modulating said light from said first light source with a pre-modulator to generate a modulated illumination beam prior to said step of illuminating said SLM.

EEE 23. The method of EEE 22, further comprising:
combining said modulated illumination beam and said light from said second light steered by said beam steering device to generate a combined illumination beam; and
said step of illuminating said SLM with light from said first light source comprises illuminating said SLM with said combined illumination beam.

EEE 24. The method of EEE 22, further comprising:
modeling a light field incident on said SLM based on said modulated illumination beam; and
adjusting said image data based on said modeled light field prior to asserting said image data on said SLM.

EEE 25. The method of EEE 24, further comprising modeling said light field incident on said SLM based on said highlight data.

EEE 26. The method of EEE 20, further comprising:
illuminating a second SLM configured to have said image data asserted thereon with light from said second light source; and
redirecting at least some of said light from said second light source to said beam steering device prior to said light from said second light source reaching said second SLM.

EEE 27. The method of EEE 20, wherein:
said step of receiving image data includes sometimes receiving 3D image data and other times receiving 2D image data;
said first light source is associated with a first-eye view present in said image data when said image data comprises 3D image data;
said second light source is associated with a second-eye view present in said image data when said image data comprises 3D image data; and
said second light source has different spectral characteristics than said first light source.

EEE 28. The method of EEE 20, wherein said image data comprises 2D image data.

EEE 29. The method of EEE 20, wherein said image data comprises 3D image data.

EEE 30. The method of EEE 20, further comprising polarizing said highlighted imaging beam.

EEE 31. The method of EEE 30, wherein said step of polarizing said highlighted imaging beam comprises polarizing said highlighted imaging beam using a light doubler.

EEE 32. A 3D projection system comprising:
an image data input operative to receive 3D image data;
a first light source;
a second light source;
a first projector including
a spatial light modulator (SLM) disposed to receive light from said first light source and being operative to modulate said light from said first light source based on said 3D image data to generate a first imaging beam associated with a first-eye view present in said 3D image data,
a controller coupled to receive at least a portion of said 3D image data associated with said first-eye view and being operative to generate highlight data based on said 3D image data associated with said first-eye view, to provide said 3D image data associated with said first-eye view to said SLM, and to output said highlight data, and
a beam steering device coupled to receive said highlight data from said controller and disposed to receive light from said second light source, said beam steering device being operative to steer said light from said second light source to highlight regions of said SLM based on said highlight data such that said SLM also modulates light from said second light source according to said 3D image data associated with said first-eye view to impart highlights in said first imaging beam,
projection optics disposed in the path of said first imaging beam and operative to focus said first imaging beam on a viewing surface, and
a first polarization device disposed in the path of said first imaging beam and being operative to impart a first polarization state on said first imaging beam;
a second projector operative to generate a second imaging beam associated with a second-eye view present in said 3-D image data, said second imaging beam having a second polarization state different than said first polarization state.

EEE 33. The 3D projection system of EEE 32, wherein said second projector is configured to impart highlights in said second imaging beam.

EEE 34. The 3D projection system of EEE 32, wherein said first polarization state is orthogonal to said second polarization state.

EEE 35. The 3D projection system of EEE 32, wherein said first polarization device comprises a light doubler.

EEE 36. The 3D projection system of EEE 32, further comprising 3D glasses including a first lens having said first polarization state and a second lens having said second polarization state.

EEE 37. A method for providing highlighted views in a 3D projection system, said method comprising:
receiving 3D image data to be displayed by a first spatial light modulator (SLM);
generating a first highlighted imaging beam associated with a first-eye view present in said 3D image data by
generating first highlight data based on a portion of said 3D image data associated with said first-eye view,
illuminating said first SLM with light from said first light source,
illuminating a beam steering device with light from a second source,
using said beam steering device to steer said light from said second light source to highlight regions of said first SLM based on said highlight data, and
asserting said 3D image data associated with said first-eye view on said first SLM to modulate light from said first light source and light from said second light source to generate said highlighted imaging beam;
polarizing said first highlighted imaging beam in a first polarization state;
generating a second imaging beam associated with a second-eye view present in said 3D image; and
polarizing said second highlighted imaging beam in a second polarization state different than said first polarization state.

EEE 38. The method of EEE 37, wherein said second imaging beam includes highlights.

EEE 39. The method of EEE 37, wherein said first polarization state is orthogonal to said second polarization state.

EEE 40. The method of EEE 37, wherein said step of polarizing said first highlighted imaging beam comprises polarizing said highlighted imaging beam using a light doubler.

EEE 41. A method for displaying 2D image data with a 3D projection system having a first light source associated with a first-eye view present in 3D image data and a second light source associated with a second-eye view present in said 3D image data and having different spectral characteristics than said first light source, said method comprising:
receiving image data to be displayed by a spatial light modulator (SLM);

determining whether said image data comprises 3D image data or 2D image data; asserting said image data on said SLM;
illuminating said SLM with light from said first light source; and
if said image data is determined to be 2D image data, causing said SLM to be further illuminated by light from said second light source.

EEE 42. A non-transitory, electronically-readable storage medium having code embodied thereon for causing a 3D projection system to display 2D image data, said 3D projection system having a first light source associated with a first-eye view present in 3D image data and a second light source associated with a second-eye view present in said 3D image data and having different spectral characteristics than said first light source, said code being operative to cause said 3D projection system to:
receive image data to be displayed by a spatial light modulator (SLM);
determine whether said image data is 3D image data or 2D image data;
assert said image data on said SLM;
illuminate said SLM with light from said first light source; and
if said image data is determined to be 2D image data, further illuminate said SLM with light from said second light source.

EEE 43. A method for displaying 2D image data with a 3D projection system having a first light source associated with a first-eye view present in 3D image data and a second light source associated with a second-eye view present in said 3D image data and having different spectral characteristics than said first light source, said method comprising:
receiving image data to be displayed by a spatial light modulator (SLM);
asserting said image data on said SLM;
illuminating said SLM with an illumination beam from one of said first light source and said second light source;
determining whether said image data is 3D image data or 2D image data; and
if said image data is determined to be 2D image data, causing at least a portion of said illumination beam to be redirected from said SLM to a second SLM configured to have said 2D image data asserted thereon.

EEE 44. A non-transitory, electronically-readable storage medium having code embodied thereon for causing a 3D projection system to display 2D image data, said 3D projection system having a first light source associated with a first-eye view present in 3D image data and a second light source associated with a second-eye view present in said 3D image data and having different spectral characteristics than said first light source, said code being operative to cause said 3D projection system to:
receive image data to be displayed by a spatial light modulator (SLM);
assert said image data on said SLM;
illuminate said SLM with an illumination beam from one of said first light source and said second light source;
determine whether said image data is 3D image data or 2D image data; and
if said image data is determined to be 2D image data, redirect at least a portion of said illumination beam from said SLM to a second SLM configured to have said 2D image data asserted thereon.

EEE 45. A method of manufacturing a projection system, said method comprising:
providing a first light source;
providing a second light source;
providing a spatial light modulator (SLM) disposed to receive light from at least one of said first light source and said second light source and being operative to modulate light to generate an imaging beam;
providing a beam steering device disposed to receive light from said second light source and being operative to controllably steer light from said second light source toward selected regions of said SLM; and
providing a beam combiner disposed to receive said light from said first light source and said steered light from said beam steering device and being operative to combine said light from said first light source and said steered light from said second light source and provide said combined light to said SLM.

EEE 46. The method of EEE 45, further comprising providing a polarization device disposed in an imaging beam path of said SLM.

The invention claimed is:

1. A projection system comprising:
an image data input operative to receive image data;
a first light source operative to emit a first illumination beam;
a second light source operative to emit a second illumination beam;
a spatial light modulator (SLM) disposed to receive light from said first light source and being operative to modulate said light from said first light source based on said image data to generate an imaging beam;
a controller coupled to receive said image data and being operative to generate highlight data based on said image data, to provide said image data to said SLM, and to output said highlight data;
a beam steering device coupled to receive said highlight data from said controller, said beam steering device disposed to receive at least a portion of said second illumination beam and being operative to steer said at least a portion of said second illumination beam to highlight regions of said SLM based on said highlight data such that said SLM also modulates light from said second light source according to said image data to impart highlights in said imaging beam;
projection optics disposed in the path of said imaging beam and operative to focus said imaging beam on a viewing surface;
a second SLM disposed to receive light from said second light source and operative to modulate said light from said second light source based on said image data to generate a second imaging beam; and
a redirector disposed to receive said second illumination beam and selectively redirect some of said second illumination beam to said beam steering device prior to light from said second light source reaching said second SLM.

2. The projection system of claim 1, wherein:
said first light source comprises a first set of primary lasers; and
said second light source comprises a second set of primary lights having a different spectral composition than said first set of primary lasers.

3. The projection system of claim 1, wherein:
said first light source comprises a first white light source;
said second light source comprises a second white light source; and said first white light source and said second white light source comprise different wavelength bands of red, green, and blue light.

4. The projection system of claim 1, wherein the redirector is configured to selectively redirect approximately 15% of the second illumination beam to said beam steering device.

5. The projection system of claim 1, wherein the redirector is configured to selectively redirect by switching between a 2D mode, wherein the redirector is configured to redirect some of said second illumination beam to said beam steering device, and a 3D mode, wherein the redirector is configured to pass all of the light of said second illumination beam to said second SLM.

6. The projection system of claim 1, wherein said beam steering device comprises a liquid crystal on silicon (LCOS) display or a deformable mirror device (DMD).

7. The projection system of claim 1, further comprising a pre-modulator disposed in the path of said first illumination beam and being operative to modulate said first illumination beam to generate a modulated first illumination beam.

8. The projection system of claim 7, further comprising:
a beam combiner disposed to receive said modulated first illumination beam and said at least a portion of said second illumination beam and being operative to combine said modulated first illumination beam and said at least a portion of said second illumination beam to generate a combined illumination beam and provide said combined illumination beam to said SLM.

9. The projection system of claim 8, wherein said beam combiner comprises an optical thin film filter.

10. The projection system of claim 7, wherein said controller is further operative to:
model a light field incident on said SLM based on said modulated first illumination beam; and
adjust said image data based on said light field prior to providing said 2D image data to said SLM.

11. The projection system of claim 10, wherein said controller is further operative to:
model said light field incident on said SLM based on said highlight data.

12. The projection system of claim 1, wherein:
said image data input is configured to receive 3D image data or 2D image data;
said first light source is associated with a first-eye view present in said image data when said image data comprises 3D image data;
said second light source is associated with a second-eye view present in said image data when said image data comprises 3D image data; and
said second light source has different spectral characteristics than said first light source.

13. The projection system of claim 12, wherein:
when said image data comprises 2D image data, said controller receives said 2D image data and is operative to generate said highlight data based on said 2D image data and provide said 2D image data to said SLM; and
when said image data comprises 2D image data, said SLM modulates said light from said first light source and said light from said second light source according to said 2D image data.

14. The projection system of claim 1, further comprising:
a polarization device disposed in the path of said imaging beam and being operative to impart a polarization state on said imaging beam.

15. The projection system of claim 14, wherein said polarization device comprises a light doubler.

16. A method for displaying image data with a projection system having a first light source and a second light source, said method comprising:
receiving image data to be displayed by a first spatial light modulator (SLM);
generating highlight data based on said image data;
illuminating said first SLM with light from said first light source; and
illuminating a second SLM with light from said second light source,
wherein in a 2D mode, the method comprises the steps of:
redirecting some of said light from said second light source to a beam steering device prior to said light from said second light source reaching said second SLM;
asserting said highlight data on said beam steering device to steer said redirected light from said second light source to highlight regions of said first SLM based on said highlight data; and
asserting said image data on said first SLM to modulate said light from said first light source and said redirected light from said second light source to generate a highlighted imaging beam.

17. The method of claim 16, wherein in a 3D mode, the method comprises the step of passing all of the light of said second illumination beam to said second SLM.

18. The method of claim 17, comprising operating in the 2D mode if the received image data comprises 2D image data and operating in the 3D mode if the received image data comprises 3D image data.

19. The method of claim 16, wherein:
said first light source is associated with a first-eye view present in said image data when said image data comprises 3D image data;
said second light source is associated with a second-eye view present in said image data when said image data comprises 3D image data; and
said second light source has different spectral characteristics than said first light source.

* * * * *